(12) United States Patent
Mori et al.

(10) Patent No.: US 12,132,423 B2
(45) Date of Patent: Oct. 29, 2024

(54) CONTROLLER FOR AC ROTARY ELECTRIC MACHINE AND ELECTRIC POWER STEERING APPARATUS

(71) Applicant: Mitsubishi Electric Corporation, Tokyo (JP)

(72) Inventors: Tatsuya Mori, Tokyo (JP); Akira Furukawa, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 18/000,902

(22) PCT Filed: Jun. 18, 2020

(86) PCT No.: PCT/JP2020/023916
§ 371 (c)(1),
(2) Date: Dec. 6, 2022

(87) PCT Pub. No.: WO2021/255887
PCT Pub. Date: Dec. 23, 2021

(65) Prior Publication Data
US 2023/0268859 A1    Aug. 24, 2023

(51) Int. Cl.
*H02P 21/22* (2016.01)
*B62D 5/04* (2006.01)
(Continued)

(52) U.S. Cl.
CPC .......... *H02P 21/05* (2013.01); *B62D 5/0409* (2013.01); *B62D 5/046* (2013.01); *H02P 27/08* (2013.01)

(58) Field of Classification Search
CPC .......... H02P 21/05; H02P 27/08; H02P 23/04; H02P 29/50
See application file for complete search history.

(56) References Cited

U.S. PATENT DOCUMENTS

| 6,674,789 B1 | 1/2004 | Fardoun et al. |
| 2021/0114652 A1 | 4/2021 | Mori et al. |

(Continued)

FOREIGN PATENT DOCUMENTS

| JP | 2001-346393 A | 12/2001 |
| JP | 4629938 B2 | 2/2011 |
| JP | 6644172 B2 | 2/2020 |

OTHER PUBLICATIONS

International Search Report for PCT/JP2020/023916 dated Aug. 25, 2020.

*Primary Examiner* — Muhammad S Islam
(74) *Attorney, Agent, or Firm* — Sughrue Mion, PLLC; Richard C. Turner

(57) ABSTRACT

To provide a controller for AC rotary electric machine which can suppress the increase in the unwanted sound while reducing noise. A controller for AC rotary electric machine switches n pieces of zero phase candidate voltage values in order for every switching period and calculate as a zero phase voltage value; by defining a deviation between the zero phase voltage value and a time lag zero phase voltage value delaying by a j times value of the switching period, as a zero phase time lag deviation value; j is a natural number which minimizes a difference between a half period of a mechanical resonance period, and the j times value of switching period; an effective value of the zero phase time lag deviation value becomes small, compared with an effective value of AC component of the zero phase voltage value.

8 Claims, 34 Drawing Sheets

(51) Int. Cl.
*H02P 21/05* (2006.01)
*H02P 27/08* (2006.01)

(56) References Cited

U.S. PATENT DOCUMENTS

2021/0211078 A1* 7/2021 Iezawa .................... H02P 21/18
2022/0131488 A1* 4/2022 Harada ................... H02P 27/08

* cited by examiner

FIG. 4

PRESENT DISCLOSURE (n= 80)

| | | | |
|---|---|---|---|
| Vzc_1 | −0.33048 | Vzc_41 | 0.19584 |
| Vzc_2 | 0.10234 | Vzc_42 | 0.0289 |
| Vzc_3 | −0.29002 | Vzc_43 | 0.45254 |
| Vzc_4 | 0.43248 | Vzc_44 | −0.59874 |
| Vzc_5 | −0.6256 | Vzc_45 | 0.23052 |
| Vzc_6 | 0.53958 | Vzc_46 | −0.05916 |
| Vzc_7 | −0.59398 | Vzc_47 | 0.2737 |
| Vzc_8 | 0.58718 | Vzc_48 | 0.19074 |
| Vzc_9 | −0.5984 | Vzc_49 | −0.11934 |
| Vzc_10 | 0.67116 | Vzc_50 | −0.10642 |
| Vzc_11 | −0.65416 | Vzc_51 | −0.20978 |
| Vzc_12 | 0.41276 | Vzc_52 | −0.14552 |
| Vzc_13 | −0.26112 | Vzc_53 | −0.2057 |
| Vzc_14 | 0.38794 | Vzc_54 | 0.06324 |
| Vzc_15 | 0.02635 | Vzc_55 | 0.00306 |
| Vzc_16 | 0.2686 | Vzc_56 | −0.19516 |
| Vzc_17 | 0.24837 | Vzc_57 | 0.61404 |
| Vzc_18 | 0.20944 | Vzc_58 | −0.10676 |
| Vzc_19 | 0.35428 | Vzc_59 | −0.05576 |
| Vzc_20 | −0.08942 | Vzc_60 | 0.56984 |
| Vzc_21 | −0.2567 | Vzc_61 | −0.38386 |
| Vzc_22 | −0.00136 | Vzc_62 | 0.3791 |
| Vzc_23 | −0.62594 | Vzc_63 | 0.12478 |
| Vzc_24 | 0 | Vzc_64 | 0.08024 |
| Vzc_25 | −0.39508 | Vzc_65 | 0.07276 |
| Vzc_26 | −0.37774 | Vzc_66 | 0.37774 |
| Vzc_27 | 0.1156 | Vzc_67 | 0.15334 |
| Vzc_28 | 0.0901 | Vzc_68 | 0.2074 |
| Vzc_29 | 0.16762 | Vzc_69 | 0.59398 |
| Vzc_30 | 0.46376 | Vzc_70 | −0.19652 |
| Vzc_31 | −0.3672 | Vzc_71 | 0.2057 |
| Vzc_32 | 0.37366 | Vzc_72 | 0.27132 |
| Vzc_33 | −0.41922 | Vzc_73 | −0.23494 |
| Vzc_34 | −0.25636 | Vzc_74 | 0.50388 |
| Vzc_35 | −0.44404 | Vzc_75 | −0.07837 |
| Vzc_36 | −0.03808 | Vzc_76 | −0.09214 |
| Vzc_37 | −0.00306 | Vzc_77 | 0.07973 |
| Vzc_38 | 0.55488 | Vzc_78 | −0.42466 |
| Vzc_39 | 0.2567 | Vzc_79 | −0.27744 |
| Vzc_40 | 0.6341 | Vzc_80 | −0.20638 |

FIG. 18

PRESENT DISCLOSURE (n=10)

| Vzc_1  | -0.33048 |
|--------|----------|
| Vzc_2  | 0.10234  |
| Vzc_3  | -0.29002 |
| Vzc_4  | 0.43248  |
| Vzc_5  | -0.6256  |
| Vzc_6  | 0.53958  |
| Vzc_7  | -0.59398 |
| Vzc_8  | 0.58718  |
| Vzc_9  | -0.5984  |
| Vzc_10 | 0.67116  |

FIG. 22

PRESENT DISCLOSURE (n=40)

| | |
|---|---|
| Vzc_1 | −0.33048 |
| Vzc_2 | 0.10234 |
| Vzc_3 | −0.29002 |
| Vzc_4 | 0.43248 |
| Vzc_5 | −0.6256 |
| Vzc_6 | 0.53958 |
| Vzc_7 | −0.59398 |
| Vzc_8 | 0.58718 |
| Vzc_9 | −0.5984 |
| Vzc_10 | 0.67116 |
| Vzc_11 | −0.65416 |
| Vzc_12 | 0.41276 |
| Vzc_13 | −0.26112 |
| Vzc_14 | 0.38794 |
| Vzc_15 | 0.02635 |
| Vzc_16 | 0.2686 |
| Vzc_17 | 0.24837 |
| Vzc_18 | 0.20944 |
| Vzc_19 | 0.35428 |
| Vzc_20 | −0.08942 |
| Vzc_21 | −0.2567 |
| Vzc_22 | −0.00136 |
| Vzc_23 | −0.62594 |
| Vzc_24 | 0 |
| Vzc_25 | −0.39508 |
| Vzc_26 | −0.37774 |
| Vzc_27 | 0.1156 |
| Vzc_28 | 0.0901 |
| Vzc_29 | 0.16762 |
| Vzc_30 | 0.46376 |
| Vzc_31 | −0.3672 |
| Vzc_32 | 0.37366 |
| Vzc_33 | −0.41922 |
| Vzc_34 | −0.25636 |
| Vzc_35 | −0.44404 |
| Vzc_36 | −0.03808 |
| Vzc_37 | −0.00306 |
| Vzc_38 | 0.55488 |
| Vzc_39 | 0.2567 |
| Vzc_40 | 0.6341 |

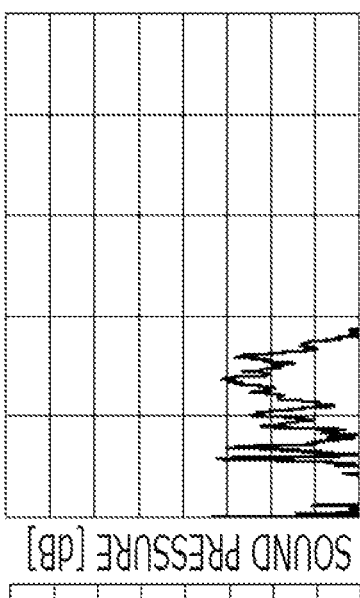
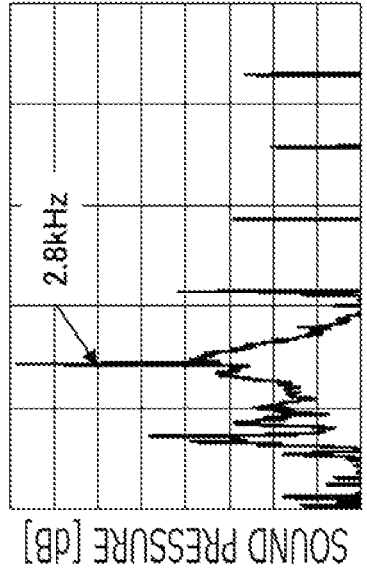
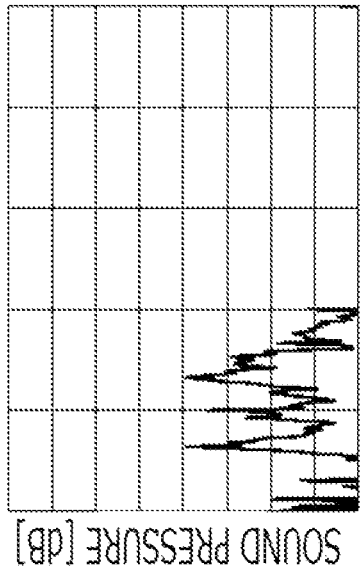
FIG. 32

FIG. 34

| SPu | SNu | SPv | SNv | SPw | SNw | BASIC VOLTAGE VECTOR |
|---|---|---|---|---|---|---|
| 0 | 1 | 0 | 1 | 0 | 1 | V0 |
| 1 | 0 | 0 | 1 | 0 | 1 | V1 |
| 1 | 0 | 1 | 0 | 0 | 1 | V2 |
| 0 | 1 | 1 | 0 | 0 | 1 | V3 |
| 0 | 1 | 1 | 0 | 1 | 0 | V4 |
| 0 | 1 | 0 | 1 | 1 | 0 | V5 |
| 1 | 0 | 0 | 1 | 1 | 0 | V6 |
| 1 | 0 | 1 | 0 | 1 | 0 | V7 |

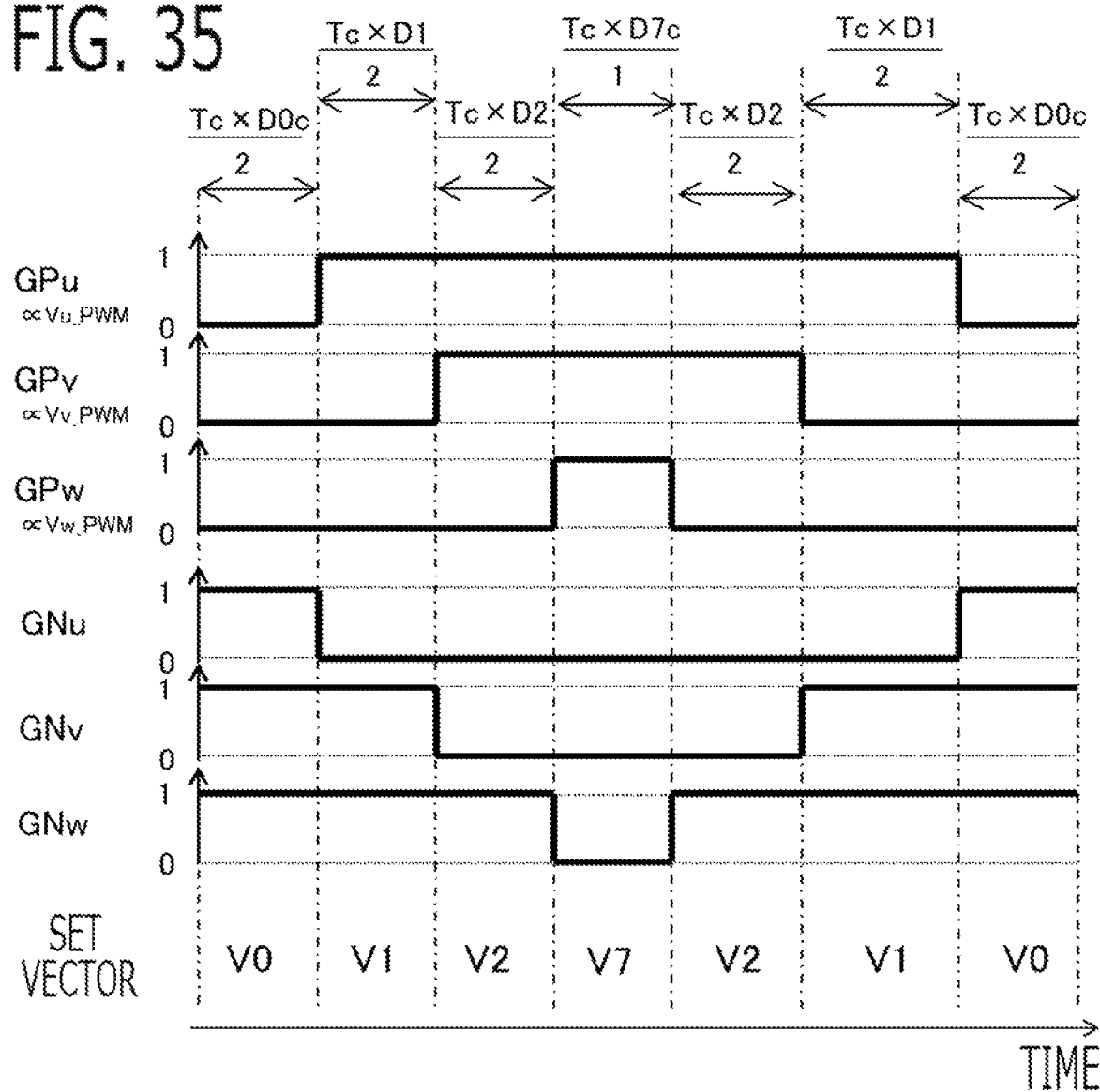

CONTROLLER FOR AC ROTARY ELECTRIC MACHINE AND ELECTRIC POWER STEERING APPARATUS

CROSS REFERENCE TO RELATED APPLICATIONS

This application is a National Stage of International Application No. PCT/JP2020/023916 filed Jun. 18, 2020.

TECHNICAL FIELD

The present disclosure is related with a controller for AC rotary electric machine and an electric power steering apparatus.

BACKGROUND ART

The patent document 1 discloses the technology that, in order to provide an AC rotary electric machine with small electrical noise, prepares a plurality of carrier waves with different frequencies, selects one from the plurality of prepared carrier waves at random for every predetermined time, and performs the PWM control using the selected carrier wave, and drives the AC rotary electric machine.

The patent document 2 discloses the technology that is provided with, as the reduction method of noise (EMI) by dithering of switching frequency, a process of providing a controller which performs signal communication with a motor using a controller including at least one register in order to control the motor based on its operation parameters; a process of selecting a first clock frequency; a process of selecting a first switching frequency; a process of initializing at least one register and thereby setting at least one defined number; a process of selecting a first hopping period; and a process of modulating a switching frequency of pulse modulation at random based on at least one defined number of at least one register, the first clock frequency, and the first hopping frequency.

The patent document 3 discloses the technology that is provided with an offset voltage calculation unit that calculates an offset voltage; and a corrected three phase voltage command values calculation unit that outputs three phase voltage command values corrected by adding the offset voltage equally to each of the voltage command values of three-phase, wherein the offset voltage calculation unit switches n pieces of offset candidate voltages whose values are different for every set time and outputs as the offset voltage, and thereby, varies equally ON timing and OFF timing of the applied voltages to three-phase winding, and reduces noise (EMI).

CITATION LIST

Patent Literature

Patent document 1: JP 2001-346393 A
Patent document 2: JP 4629938 B
Patent document 3: JP 6644172 B

SUMMARY OF INVENTION

Technical Problem

In the technologies of the patent document 1 and the patent document 2, there are following problems of (1) and (2).

(1) In the method which prepares the plurality of frequencies of the carrier wave, and selects one from the plurality of frequencies, since it is necessary to store a plurality of carrier waves, and perform PWM control corresponding to the plurality of frequencies of carrier waves, memory capacity and processing load increase, and implementation to a cheap microcomputer (CPU) is not easy.

(2) It is not easy to implement in a microcomputer (CPU) so that the carrier wave can be changed arbitrarily.

Then, in the patent document 3, to the problems of (1) and (2), without changing the PWM control itself, the noise (EMI) is reduced using addition of the offset voltage whose processing can be added easily.

However, in the technology of the patent document 3, the characteristics of the mechanical resonance period of the AC rotary electric machine is not considered. And, by addition of the random offset voltage selected in order from the n pieces of offset candidate voltages whose values are different, a component of the mechanical resonance period included in the applied voltage increases, and the unwanted sound of the AC rotary electric machine may increase. The patent document 3 does not disclose a setting method of the n pieces of offset candidate voltages for preventing the unwanted sound of the AC rotary electric machine from increasing due to the mechanical resonance period of the AC rotary electric machine.

Then, the purpose of the present disclosure is to provide a controller for AC rotary electric machine and an electric power steering apparatus which can suppress the increase in the unwanted sound of the AC rotary electric machine, while reducing noise (EMI), considering the mechanical resonance period of the AC rotary electric machine.

Solution to Problem

A controller for AC rotary electric machine according to the present disclosure is a controller for AC rotary electric machine that controls an AC rotary electric machine which is provided with a stator where three-phase windings are wound and a rotor, via an inverter which is provided a plurality of switching devices, the controller for AC rotary electric machine including:

a voltage command calculation unit that calculates voltage command values of three-phase applied to the three-phase windings, or a command voltage vector which expresses voltages applied to the three-phase windings in a two-axis fixed coordinate system correlated with the three-phase windings;

a zero phase voltage value calculation unit that switches n pieces (n is a natural number greater than or equal to two) of zero phase candidate voltage values whose values are different with each other, in order, for every switching period, and calculates as a zero phase voltage value;

a voltage command correction unit that corrects the voltage command values of three-phase or the command voltage vector, based on the zero phase voltage value; and a PWM control unit that controls on/off of the plurality of switching devices, based on the voltage command values of three-phase after correction or the command voltage vector after correction by the voltage command correction unit;

wherein, by defining a deviation between the zero phase voltage value, and a time lag zero phase voltage value obtained by delaying the zero phase voltage value by a j times value of the switching period (j is a natural number greater than or equal to one), as a zero phase time lag deviation value, j is a natural number which minimizes a difference between a half period of a mechanical resonance period of the AC rotary electric machine, and the j times value of switching period, and the n pieces of zero phase candidate voltage values are preliminarily set so that an effective value of the zero phase time lag deviation value becomes small compared with an effective value of an AC component of the zero phase voltage value.

An electric power steering apparatus according to the present disclosure including:

the controller for AC rotary machine, the inverter, the AC rotary electric machine, and a driving force transmission mechanism that transmits a driving force of the AC rotary electric machine to a steering device of a vehicle, wherein a PWM period of the PWM control unit is set less than or equal to 60 μs, and wherein the mechanical resonance period of the AC rotary electric machine is in a range greater than or equal to 200 μs and less than or equal to 500 μs.

Advantage of Invention

By setting preliminarily the n pieces of zero phase candidate voltage values as described above, the component of the mechanical resonance period included in the zero phase voltage value and the zero phase time lag deviation value can be reduced, and the increase in the unwanted sound of the AC rotary electric machine due to resonance can be suppressed. Therefore, according to the controller for AC rotary electric machine and the electric power steering apparatus of the present disclosure, the increase in the unwanted sound of the AC rotary electric machine can be suppressed, while reducing noise (EMI).

BRIEF DESCRIPTION OF THE DRAWINGS

FIG. 4 is a figure showing the setting example of the zero phase candidate voltage values of n=80 according to Embodiment 1;

FIG. 18 is a figure showing the setting example of the zero phase candidate voltage values of n=10 according to Embodiment 1;

FIG. 22 is a figure showing the setting example of the zero phase candidate voltage values of n=40 according to Embodiment 1;

FIG. 32 is a figure showing the measured result of the sound level when changing setting of the zero phase voltage value in the condition where winding current is large according to Embodiment 2;

FIG. 34 is a figure explaining eight on-off patterns and eight voltage vectors according to Embodiment 3; and FIG. 35 is a time chart for explaining PWM control according to Embodiment 3.

DETAILED DESCRIPTION OF THE EMBODIMENTS

1. Embodiment 1

Figure 1:
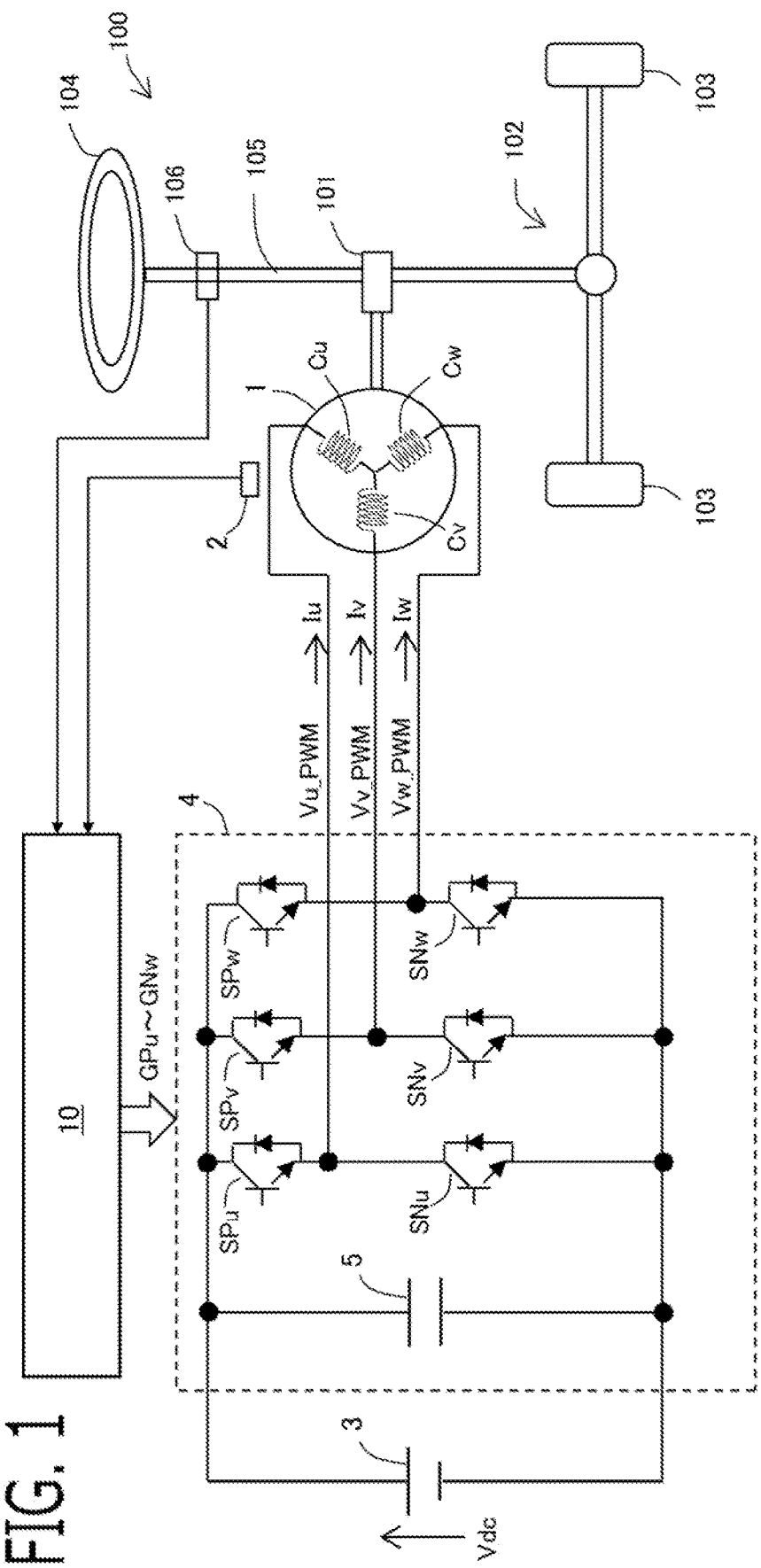
FIG. 1 is a schematic configuration diagram of the AC rotary electric machine, the inverter, and the controller according to Embodiment 1.

A controller for AC rotary electric machine 10 (hereinafter, referred to simply as the controller 10) according to Embodiment 1 will be explained with reference to drawings. FIG. 1 is a schematic configuration diagram of an AC rotary electric machine 1, an inverter 4, and the controller 10 according to the present embodiment. In the present embodiment, the AC rotary electric machine 1 is used as a driving force source of an electric power steering apparatus 100. The AC rotary electric machine 1, the inverter 4, and the controller 10 constitute the electric power steering apparatus 100.

1-1. AC Rotary Electric Machine 1

The AC rotary electric machine 1 is provided with three-phase windings Cu, Cv, Cw of U phase, V phase, and W phase. The AC rotary electric machine 1 is provided with a stator and a rotor disposed on the radial-direction inner side of the stator. The three-phase windings Cu, Cv, Cw are wound around the stator. In the present embodiment, the AC rotary electric machine 1 is a permanent magnet type synchronous rotary electric machine in which the permanent magnet is provided in the rotor. The three-phase windings may be connected by star connection, or may be connected by A connection.

The rotor is provided with a rotation detection circuit 2 for detecting a rotational angle of the rotor. Resolver, encoder, or MR sensor is used for the rotation detection circuit 2. An output signal of the rotation detection circuit 2 is inputted into the controller 10.

1-2. Inverter 4

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to each phase of three-phase. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase. A smoothing capacitor 5 is connected between the positive electrode side and the negative electrode side of the DC power source 3.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 10 via a gate drive circuit and the like. The each switching device is turned on or turned off by the switching signals GPu to GNw outputted from the controller 10.

The DC power source 3 outputs a DC voltage Vdc to the inverter 4. In the present embodiment, the DC voltage Vdc is set to 12V. The DC power source 3 may be any apparatus which outputs the DC voltage Vdc, such as a battery, a DC-DC converter, a diode rectifier, and a PWM rectifier. A voltage sensor which detects the DC voltage Vdc may be provided in the DC power source 3, and an output signal of the voltage sensor may be inputted into the controller 10. The controller 10 may control using the detected DC voltage Vdc.

1-3. Electric Power Steering Apparatus 100

The electric power steering apparatus 100 is provided with the controller for AC rotary electric machine 10, the AC rotary electric machine 1, and a driving force transmission mechanism 101 that transmits the driving force of the AC rotary electric machine 1 to a steering apparatus 102 of a vehicle.

The rotation axis of the rotor of the AC rotary electric machine 1 is connected with the steering apparatus 102 of the wheels 103 via the driving force transmission mechanism 101. For example, the electric power steering apparatus 100 is provided with a handle 104 that a driver rotates right and left, a shaft 105 that is connected with the handle 104 and transmits a steering wheel torque by the handle 104 to the steering apparatus 102 of the wheels 103, a torque sensor 106 that is mounted on the shaft 105 and detects a steering torque Ts by the handle 104, and a driving force transmission mechanisms 101, such as a worm gear mechanism, which connects the rotation axis of the AC electric rotary machine 1 with the shaft 105. The output signal of the torque sensor 106 is inputted into the controller 10 (the input circuit 92).

1-6. Controller 10

Figure 2:
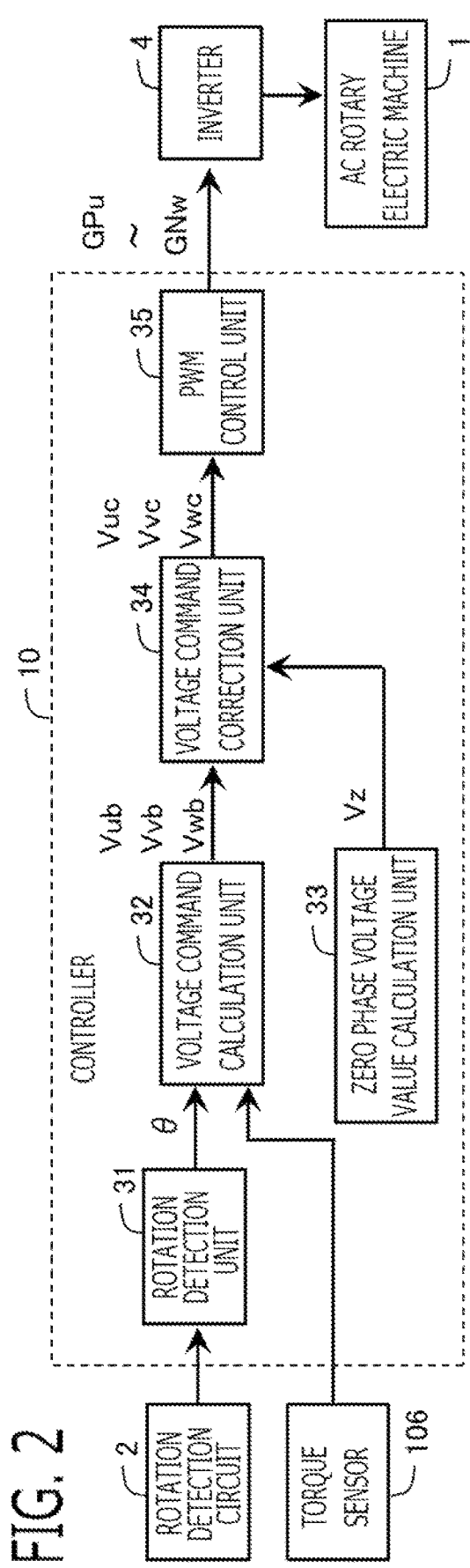
FIG. 2 is a block diagram of the controller according to Embodiment 1.
Figure 3:
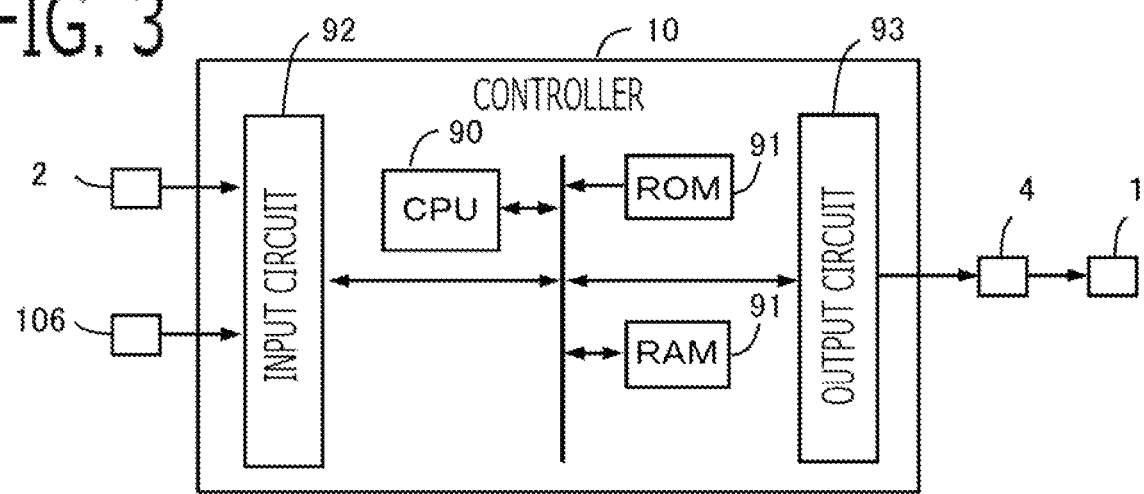
FIG. 3 is a hardware configuration diagram of the controller according to Embodiment 1.

The controller 10 controls the AC rotary electric machine 1 via the inverter 4. As shown in FIG. 2, the controller 10 is provided with a rotation detection unit 31, a voltage command calculation unit 32, a zero phase voltage value calculation unit 33, a voltage command correction unit 34, a PWM control unit 35, and the like. Each function of the controller 10 is realized by processing circuits provided in the controller 10. Specifically, as shown in FIG. 3, the controller 10 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the rotation detection circuit 2 and the torque Sensor 106, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the computing processing unit 90.

Then, the arithmetic processor 90 runs software items (programs) stored in the storage apparatus 91 such as a ROM and collaborates with other hardware devices in the controller 10, such as the storage apparatus 91, the input circuit 92, and the output circuit 93, so that the respective functions of the control units 31 to 35 provided in the controller 10 are realized. Set data items such as the n pieces of zero phase candidate voltage values $Vzc\_1$ to $Vzc\_n$, and the switching period Tv to be used in the control units 31 to 35 are stored, as part of software items (programs), in the storage apparatus 91 such as a ROM. Each function of the controller 10 will be explained in detail below.

<Rotation Detection Unit 31>

The rotation detection unit 31 detects a magnetic pole position θ (a rotational angle θ of the rotor) and a rotational angle speed ω of the rotor in an electrical angle. In the present embodiment, the rotation detection unit 31 detects the magnetic pole position θ (the rotational angle θ) and the rotational angle speed co of the rotor, based on the output signal of the rotation detection circuit 2. The magnetic pole position θ is set in the direction of the N pole of the permanent magnet provided in the rotor. The rotation detection unit 31 may estimate the rotational angle (the magnetic pole position) without using the rotation sensor, based on current information which are obtained by superimposing a harmonic wave component on the current command value (so-called, sensorless system).

<Voltage Command Calculation Unit 32>

The voltage command calculation unit 32 calculates voltage command values of three-phase Vub, Vvb, Vwb applied to the three-phase windings.

In the present embodiment, the voltage command calculation unit 32 detects a steering wheel torque Ts of the driver, based on the output signal of the torque sensor 106. The voltage command calculation unit 32 calculates the voltage command values of three-phase Vub, Vvb, Vwb, based on the steering torque Ts and the magnetic pole position θ. The details will be explained below.

As shown in the next equation, the voltage command calculation unit 32 sets a current command value of q-axis Iqo based on the steering torque Ts, and sets a current command value of d-axis Ido to 0.

$$Iqo = Ka \times Ts$$

$$Ido = 0 \qquad (1\text{-}1)$$

Herein, Ka is a constant, but it may be changed according to the steering torque Ts, the travelling speed of vehicle, and the like. The current command value of q-axis Iqo may be set using the well-known compensation control according to the steering condition. The current command values of d-axis and q-axis Ido, Iqo may be determined by well-known vector control method, such as the maximum torque/current control and the magnetic flux weakening control. The d-axis is defined in the direction of the magnetic pole position θ (N pole), and the q-axis is defined in the direction advanced to the d-axis by 90 degrees in the electrical angle.

As shown in the next equation, the voltage command calculation unit 32 converts the current command values of d-axis and q-axis Ido, Iqo into the voltage command value of d-axis Vdo and the voltage command value of q-axis Vqo, based on specifications of the AC rotary electric machine 1 (the resistance value R of winding, the d-axis inductance Ld, the q-axis inductance Lq, and the interlinkage flux ψ by permanent magnet), and the rotational angle speed ω.

$$Vdo = R \times Ido - \omega \times Lq \times Iqo$$

$$Vqo = R \times Iqo - \omega \times (Ld \times Ido + \psi) \qquad (1\text{-}2)$$

Then, as shown in the next equation, the voltage command calculation unit 32 converts the current command values of d-axis and q-axis Vdo, Vqo into the voltage command values of three-phase Vub, Vvb, Vwb, by performing a fixed coordinate conversion and a two-phase/three-phase conversion based on the magnetic pole position θ.

[Equation 1]

$$\begin{bmatrix} Vub \\ Vvb \\ Vwb \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} Vdo \\ Vqo \end{bmatrix} \qquad (1\text{-}3)$$

The voltage command calculation unit 32 may add well-known modulation, such as the third order harmonic wave superimposing, to the voltage command values of three-phase Vub, Vvb, Vwb.

<Zero Phase Voltage Value Calculation Unit 33>

The zero phase voltage value calculation unit 33 switches n pieces (n is a natural number greater than or equal to two) of zero phase candidate voltage values $Vzc\_1$, $Vzc\_2$, . . . $Vzc\_n$ whose values are different with each other, in order, for every switching period Tv, and calculates as a zero phase voltage value Vz. Set values of the n pieces of zero phase candidate voltage values $Vzc\_1$ to $Vzc\_n$ are described below.

For example, FIG. 4 shows a setting example of 80 pieces of zero phase candidate voltage values $Vzc\_1$ to $Vzc\_80$, in the case of n=80. By referring to a zero phase candidate voltage value table data in which the 80 pieces of zero phase candidate voltage values $Vzc\_1$ to $Vzc\_80$ are preliminarily set, the zero phase voltage value calculation unit 33 selects from the first zero phase candidate voltage value $Vzc\_1$ to the eightieth zero phase candidate voltage value $Vzc\_80$, in order for every switching period Tv, and calculates the selected zero phase candidate voltage value Vzc as the zero phase voltage value Vz. After the eightieth zero phase candidate voltage value $Vzc\_80$, the first zero phase candidate voltage value $Vzc\_1$ is selected. Accordingly, n times value of the switching period Tv becomes one round period Tvn (=n×Tv) when the n pieces of zero phase candidate voltage values $Vzc\_1$ to $Vzc\_n$ make one round for setting as the zero phase voltage value Vz.

<Voltage Command Correction Unit 34>

The voltage command correction unit 34 corrects the voltage command values of three-phase Vub, Vvb, Vwb, based on the zero phase voltage value Vz. In the present embodiment, as shown in the next equation, the voltage command correction unit 34 calculates the voltage command values of three-phase after correction Vuc, Vvc, Vwc by adding the zero phase voltage value Vz to each of the voltage command values of three-phase Vub, Vvb, Vwb.

$$Vuc=Vub+Vz$$

$$Vvc=Vvb+Vz$$

$$Vwc=Vwb+Vz \quad (1\text{-}4)$$

<PWM Control Unit 35>

The PWM control unit 35 controls on/off of the plurality of switching devices of the inverter 4, based on the voltage command values of three-phase after correction Vuc, Vvc, Vwc by the voltage command correction unit 34. The PWM control unit 35 compares a carrier wave CA which vibrates at a PWM period Tc with each of the voltage command values of three-phase after correction Vuc, Vvc, Vwc; and controls on/off of the plurality of switching devices based on a comparison result.

Figure 5:
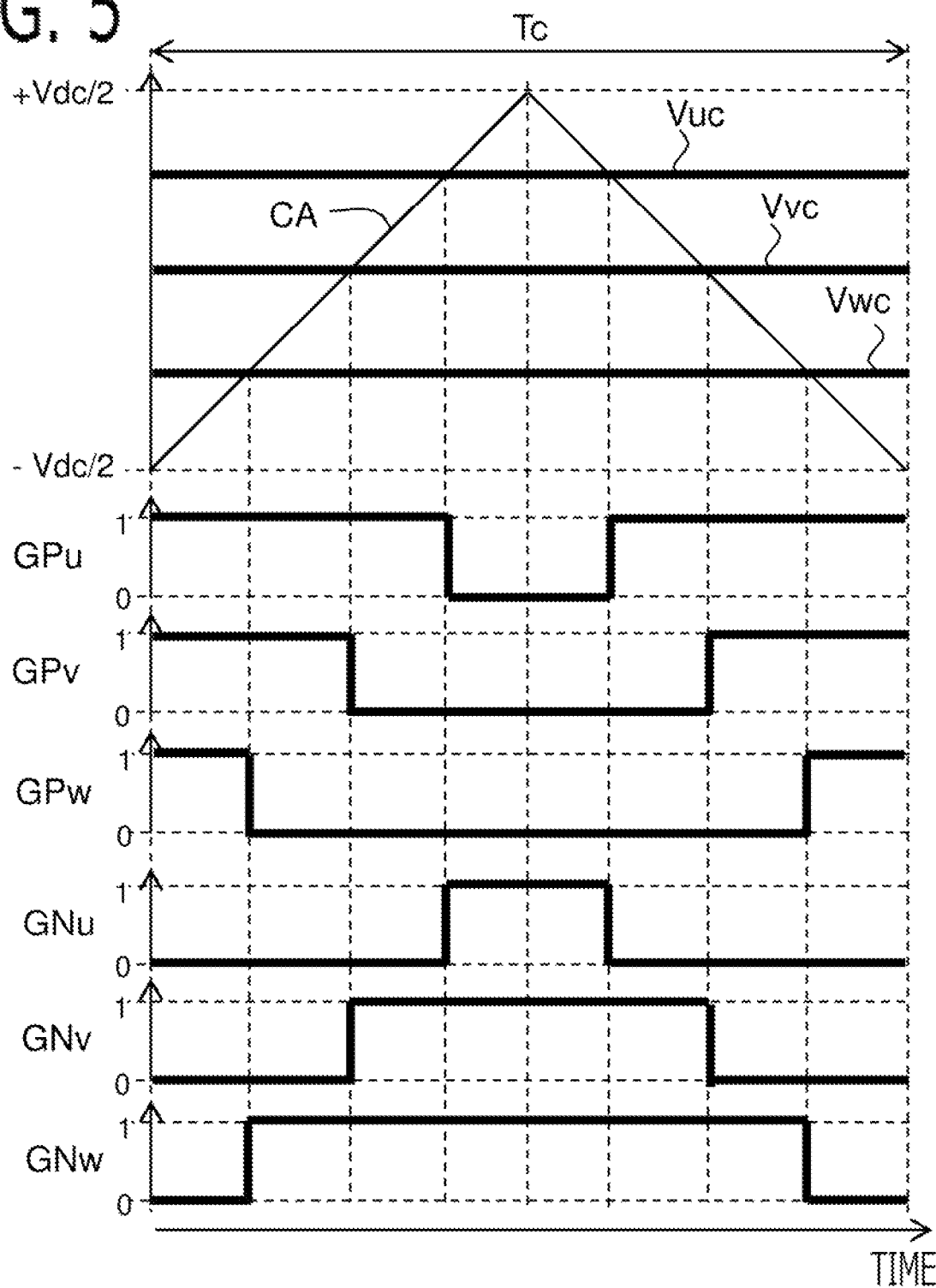
FIG. 5 is a time chart for explaining PWM control according to Embodiment 1.

As shown in FIG. 5, the carrier wave CA is a triangular wave which vibrates with an amplitude of half value Vdc/2 of DC voltage centering on 0, at the PWM period Tc. About each phase, the PWM control unit 35 turns on the switching signal GP of the positive electrode side switching device (in this example, 1) and turns on the positive electrode side switching device when the carrier wave CA is less than the voltage command value; and turns off the switching signal GP of the positive electrode side switching device (in this example, 0) and turns off the positive electrode side switching device when the carrier wave CA exceeds the voltage command value. On the other hand, about each phase, the PWM control unit 34 turns off the switching signal GN of the negative electrode side switching device (in this example, 0) and turns off the negative electrode side switching device when the carrier wave CA is less than the voltage command value; and turns on the switching signal GN of the negative electrode side switching device (in this example, 1) and turns on the negative electrode side switching device when the carrier wave CA exceeds the voltage command value. About each phase, between the on period of the positive electrode side switching device and the on period of the negative electrode side switching device, a short circuit prevention period (dead time) which turns off both of the positive electrode side and the negative electrode side switching device may be provided.

<Example of PWM Control after Addition of Zero Phase Voltage Value Vz>

Figure 6:
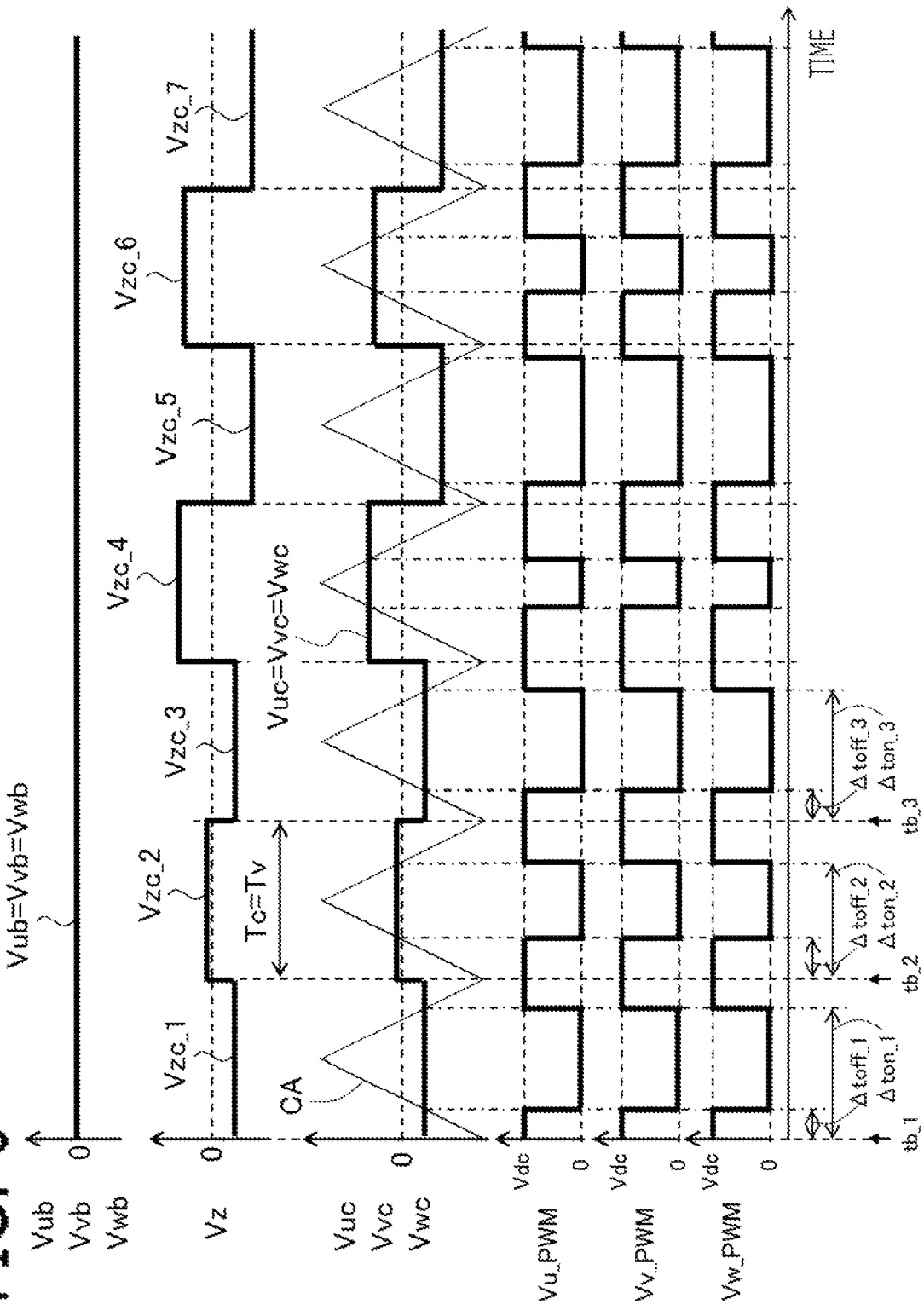
FIG. 6 is a time chart explaining the PWM control after addition of the zero phase voltage value according to Embodiment 1.

FIG. 6 shows an example of the PWM control after addition of the zero phase voltage value Vz. The switching period Tv of the zero phase voltage value Vz is set to be the same as the PWM period Tc. And, the zero phase voltage value Vz is switched at the timing of the peak point of valley of the carrier wave CA. The switching period Tv may be set to be different from the PWM period Tc. For example, the switching period Tv may be set to a natural number times of the PWM period Tc, or may be set to a natural number times of the half period of the PWM period Tc.

For every switching period Tv, in order of the first zero phase candidate voltage value Vzc_1, the second zero phase candidate voltage value Vzc_2, the third zero phase candidate voltage value Vzc_3, the fourth zero phase candidate voltage value Vzc_4, . . . , the zero phase candidate voltage value Vzc is set as the zero phase voltage value Vz in order. In FIG. 6, for simplification, the voltage command values of three-phase Vub, Vvb, Vwb are set to 0. Accordingly, all the voltage command values of three-phase Vuc, Vvc, Vwc after addition of the zero phase voltage value Vz become the same value.

As mentioned above, the voltage command values of three-phase Vuc, Vvc, Vwc after addition and the carrier wave CA are compared, and the positive electrode side and negative electrode side switching signals of three-phase are generated. As a result, when the positive electrode side switching signals of three-phase are ON, the DC voltage Vdc is applied to the three-phase windings, and when the positive electrode side switching signals of three-phase are OFF, 0V is applied to the three-phase windings. FIG. 6 shows applied voltages Vu_PWM, Vv_PWM, Vw_PWM which are applied to the three-phase windings. Even though the voltage command values of three-phase Vub, Vvb, Vwb are constant values, by adding the zero phase voltage value Vz, a period Δton_1, Aton_2, Aton_3 from the reference timing tb_1, tb_2, tb_3 of the peak point of valley of the carrier wave CA to the timing when the applied voltage of each phase Vu_PWM, Vv_PWM, Vw_PWM changes from 0V to the DC voltage Vdc, and a period Δtoff_1, Δtoff_2, Δtoff_3 from the reference timing tb_1, tb_2, tb_3 to the timing when the applied voltage of each phase Vu_PWM, Vv_PWM, Vw_PWM changes from 0V to the DC voltage Vdc are equally varied in three-phase.

<Superimposing of Harmonic Wave Component on Applied Voltage by PWM Control>

By PWM control, applied voltages of three-phase winding Vu_PWM, Vv_PWM, Vw_PWM become rectangular waves of the PWM period Tc, and any harmonic wave components are included besides components of the voltage command values of three-phase to be applied originally. Resulting from its harmonic wave components, noise (EMI) is transmitted or emitted to peripheral equipment from the inverter 4, and it becomes a factor which makes peripheral equipment malfunction. Accordingly, it is preferred to reduce the harmonic wave components included in the applied voltages of three-phase winding Vu_PWM, Vv_PWM, Vw_PWM as much as possible.

Figure 7:
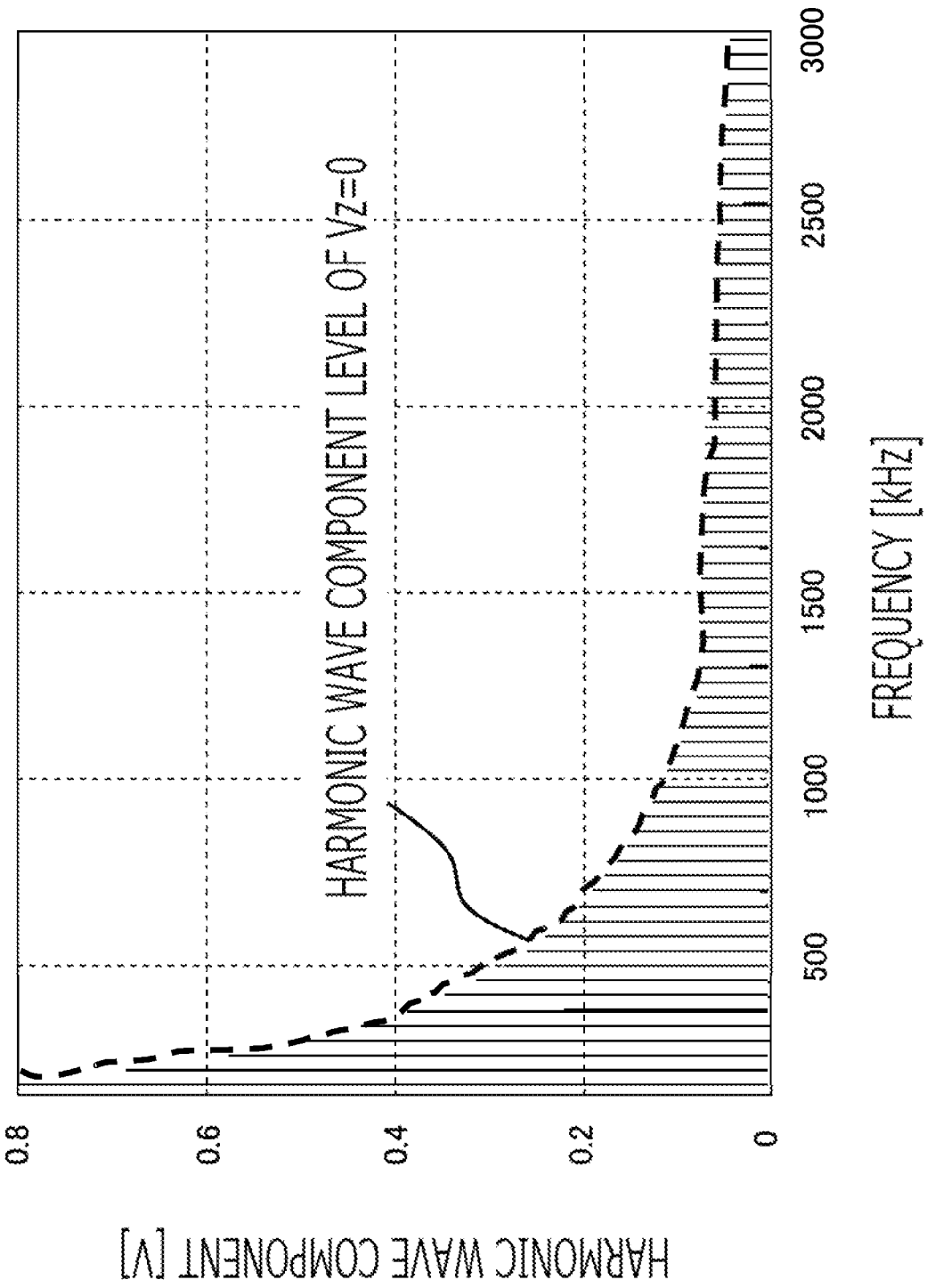
FIG. 7 is a figure showing the frequency analysis result of the applied voltage according to the comparative example in which the zero phase voltage value is not added.

FIG. 7 shows a frequency analysis result (frequency range of analysis: 150 kHz to 3000 kHz) of the applied voltage of U phase winding Vu_PWM, when the zero phase voltage value Vz is always set to 0, that is, when the zero phase voltage value Vz is not added, In this figure, the dotted line is a level of harmonic wave components which connected the level of each component. In order to reduce the noise generated from the inverter 4, it is necessary to reduce this level of harmonic wave components.

<Reduction of Harmonic Wave Components by Addition of Zero Phase Voltage Value Vz>

Figure 8:
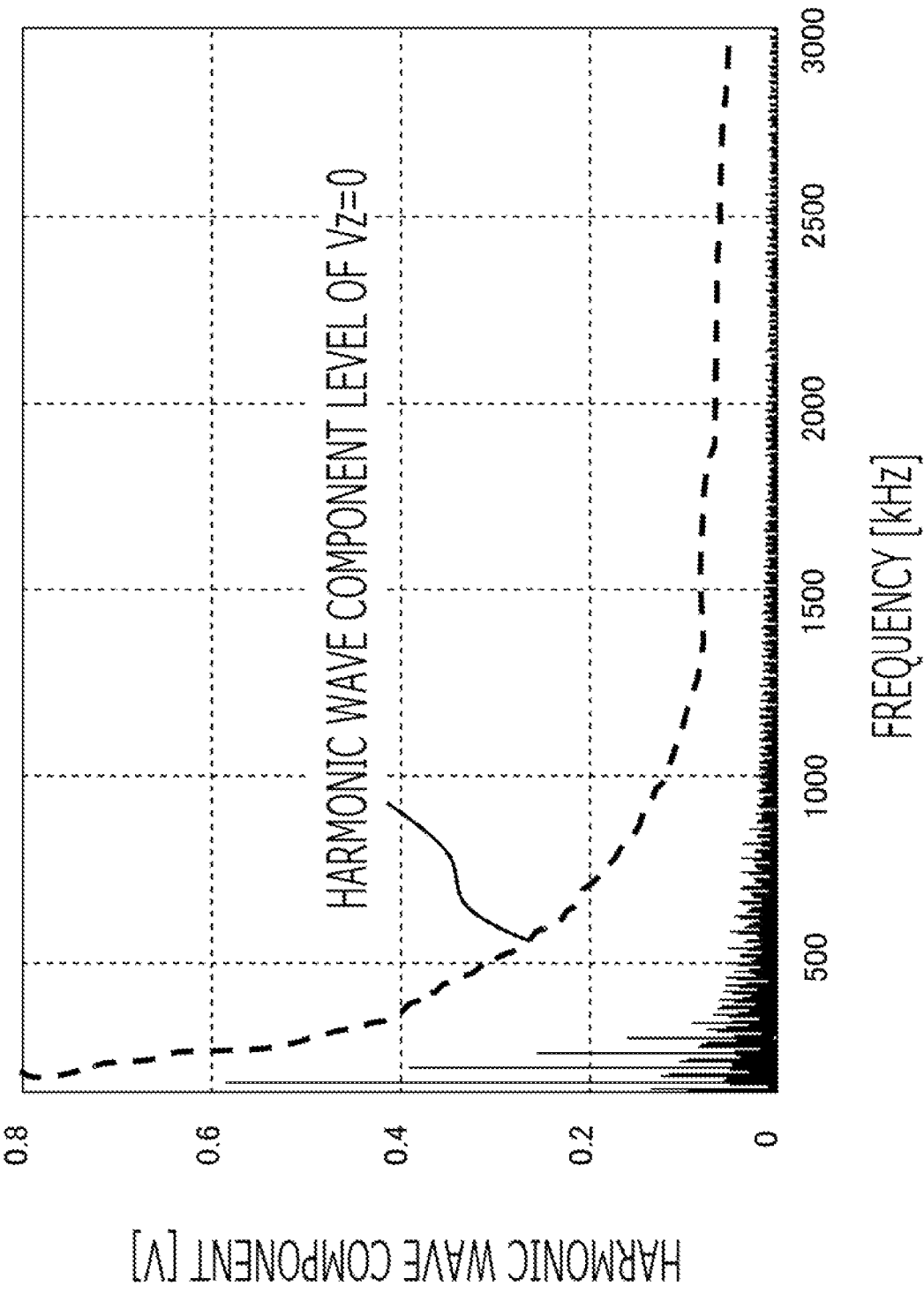
FIG. 8 is a figure showing the frequency analysis result of the applied voltage in the case of n=80 according to Embodiment 1.

FIG. 8 shows a frequency analysis result of the applied voltage Vu_PWM of U phase winding, when the zero phase voltage value Vz by the 80 pieces of zero phase candidate voltage values of FIG. 4 is added. It is set that Tc=Tv=50 μs. In FIG. 8, the dotted line shows a level of harmonic wave component shown in FIG. 7 when the zero phase voltage value Vz is not added. In this figure, since ON timing and OFF timing of the applied voltage are varied equally about all phase by addition of the zero phase voltage value Vz, the harmonic wave components are reduced in many bands of 150 kHz to 3000 kHz, and the noise (EMI) generated from the inverter 4 can be reduced.

<Necessity of Reduction of Mechanical Resonance Component Included in Zero Phase Voltage Value Vz>

In order to reduce unwanted sound generated by the AC rotary electric machine 1 including the inverter 4, it is important to reduce the component of the mechanical resonance period Tm of the AC rotary electric machine 1 included in the zero phase voltage value Vz as much as possible. Since especially, quietness is required in the electric power steering apparatus 100, this is very important.

Herein, the reason why the unwanted sound is generated in the AC rotary electric machine 1 by addition of the zero phase voltage value Vz for noise reduction will be explained. Since the zero phase voltage value Vz is equally added to the voltage command values of three-phase Vub, Vvb, Vwb, it corresponds to the "zero phase voltage" in the method of symmetrical coordinates. Accordingly, if the AC rotary electric machine 1 is a three-phase three-wire system, the line voltage between two phase voltages will not change, and the winding currents of three-phase Iu, Iv, Iw will not change by addition of the zero phase voltage value Vz. However, actually, by occurrence of a difference of conduction resistance between the positive electrode side switching device and the negative electrode side switching device of the inverter 4, a voltage difference between drain and source (in the case of MOSFET), or a voltage difference between collector and emitter (in the case of IGBT and bipolar transistor), the winding currents of three-phase Iu, Iv, Iw change by addition of the zero phase voltage value Vz. As a result, depending on the frequency band, unwanted sound may be generated from the AC rotary electric machine 1.

Figure 9:
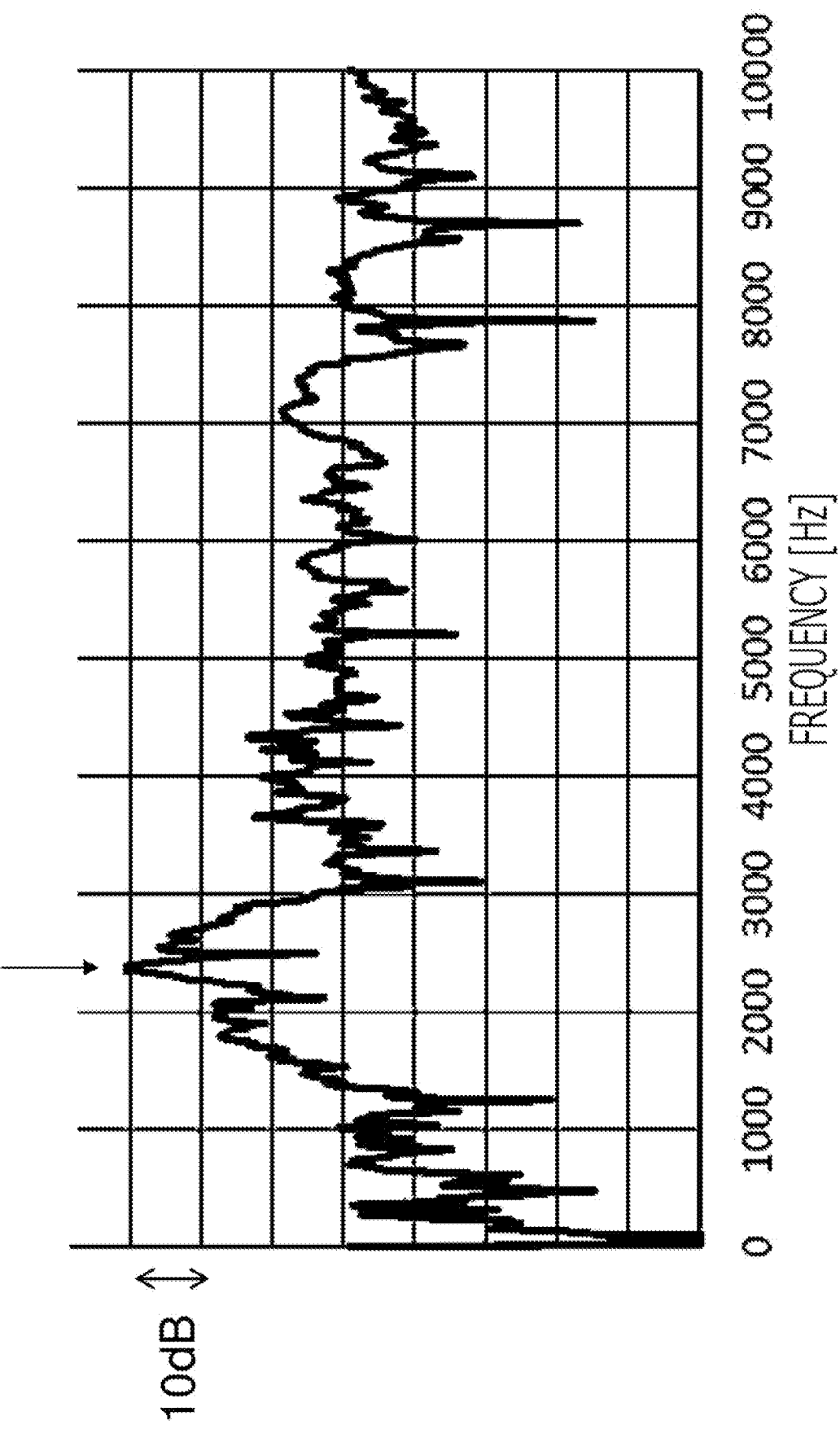
FIG. 9 is a figure showing the sensitivity characteristic of the unwanted sound of the AC rotary electric machine with respect to the winding current according to Embodiment 1.

FIG. 9 shows the measurement result of the sensitivity characteristic of unwanted sound with respect to the winding current, which was measured using the AC rotary electric machine 1 for the electric power steering apparatus. As the gain of the vertical axis becomes large, the unwanted sound of the AC rotary electric machine 1 becomes large with respect to the amplitude of the noise component of current. In this AC rotary electric machine 1, a peak exists in the vicinity of 2500 Hz. This is because the mechanical resonance frequency of the frame of the AC rotary electric machine 1 is the vicinity of 2500 Hz (the resonance period Tm is 400 μs).

The mechanical resonance of the AC rotary electric machine 1 occurs in the frame of the AC rotary electric machine 1, the power pack which integrated the AC rotary electric machine 1, the inverter 4, and the controller 10, the power apparatus which includes the frame or the power pack, and the gear mechanism, or the like.

Among various frequencies included in the variation component of the winding current generated by addition of the zero phase voltage value Vz, the component of the frequency close to the mechanical resonance frequency of the AC rotary electric machine 1 becomes the unwanted sound of the AC rotary electric machine 1 easily. Accordingly, it is desired to reduce the component of the mechanical resonance period Tm of the AC rotary electric machine 1 included in the zero phase voltage value Vz.

<Setting of n Pieces of Zero Phase Candidate Voltage Values which Satisfy Concept A>

Next, a setting method of the n pieces of zero phase candidate voltage values which reduces the component of the mechanical resonance period Tm included in the zero phase voltage value Vz will be explained.

A setting of the n pieces of zero phase candidate voltage values of the present disclosure is based on the following concept A.

Concept A:

As shown in the next equation, the n pieces of zero phase candidate voltage values Vzc_1 to Vzc_n are preliminarily set so that an effective value Vzdif_rms of the zero phase time lag deviation value Vzdif becomes small, compared with an effective value VzAC_rms of AC component VzAC of the zero phase voltage value Vz.

$$VzAC\_rms > Vzdif\_rms \tag{1-5}$$

Herein, as shown in the next equation, the AC component VzAC of the zero phase voltage value Vz becomes a value obtained by subtracting DC component (average value of the zero phase voltage value Vz in one round period Tvn (=n×Tv)) from the zero phase voltage value Vz. As shown in the next equation, the effective value VzAC_rms of AC component VzAC of the zero phase voltage value becomes a square root of a value obtained by averaging a square value of the AC component VzAC of the zero phase voltage value in the one round period Tvn. Herein, t is time.

[Equation 2]

$$VzAc(t) = Vz(t) - \frac{1}{Tvn}\int_0^{Tvn} Vz(t)dt \tag{1-6}$$

$$VzAC\_rms = \sqrt{\frac{1}{Tvn}\int_0^{Tvn} VzAc(t)^2 dt}$$

As shown in the next equation, the zero phase time lag deviation value Vzdif is a deviation between the zero phase voltage value Vz and a time lag zero phase voltage value obtained by delaying the zero phase voltage value Vz by a j times value of the switching period Tv (j is a natural number greater than or equal to one). Herein, j is set to a natural number which minimizes a difference between a half period Tm/2 of the mechanical resonance period of the AC rotary electric machine, and the j times value of the switching period Tv.

[Equation 3]

$$Vzdif(t) = Vz(t) - Vz(t - j \times Tv) \tag{1-7}$$

As shown in the next equation, the effective value Vzdif_rms of the zero phase time lag deviation value Vzdif becomes a square root of a value obtained by averaging a square value of the zero phase time lag deviation value Vzdif in the one round period Tvn.

[Equation 4]

$$Vzdif\_rms = \sqrt{\frac{1}{Tvn}\int_0^{Tvn} Vzdif(t)^2 dt} \tag{1-8}$$

The above is the concept A.

<Setting Example of n Pieces of Zero Phase Candidate Voltage Values>

Figure 10:
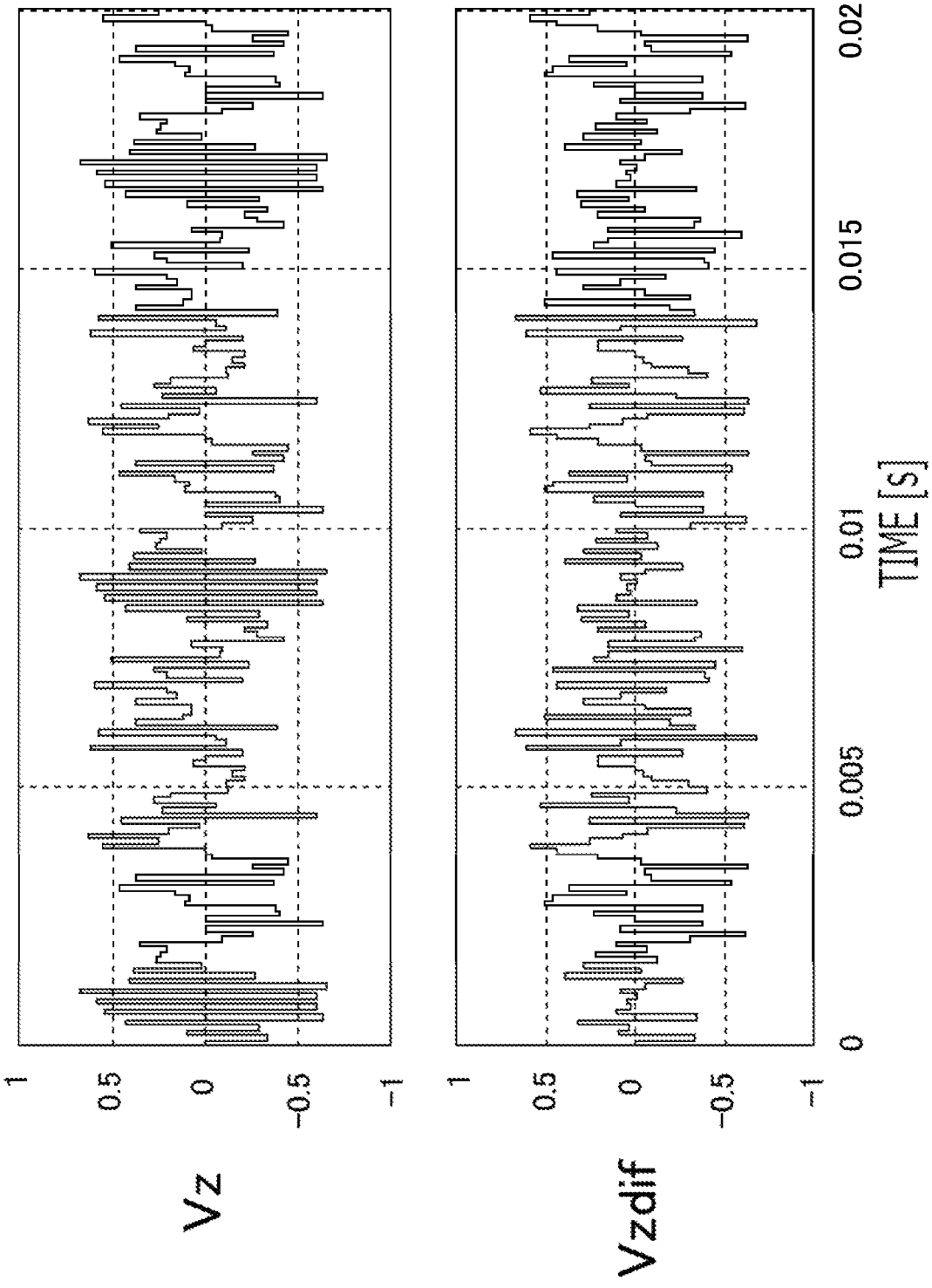
FIG. 10 is a time chart of the zero phase voltage value and the zero phase time lag deviation value in the case of n=80 according to Embodiment 1.

Next, as shown in FIG. 9, in the case where the mechanical resonance period frequency of the AC rotary electric machine 1 is 2500 Hz (mechanical resonance period Tm=400 us) and the switching period Tv of the zero phase voltage value Vz is 100 μs, j which minimizes the difference between the half period Tm/2 of the resonance period, and the j times value of the switching period Tv become 2 (j=2). The upper row of FIG. 10 shows the zero phase voltage value Vz (t) obtained by outputting the 80 pieces of zero phase candidate voltage values shown in FIG. 4 in order at the switching period Tv. The lower row of FIG. 10 shows the zero phase time lag deviation value Vzdif (t) obtained by subtracting the time lag zero phase voltage value Vz (t-200 μs) obtained by delaying the zero phase voltage value Vz (t) by the j times value of the switching period Tv (in this example, 100 μs×2=200 μs), from the zero phase voltage value Vz (t), as shown in the equation (1-7).

If the effective value VzAC_rms of the AC component of the zero phase voltage value Vz(t) of the upper row of FIG. 10 is calculated using the equation (1-6), VzAC_rms is 0.3445V. On the other hand, if the effective value Vzdif_rms of the zero phase time lag deviation value Vzdif(t) of the lower row of FIG. 10 is calculated using the equation (1-8), Vzdif_rms is 0.329V. Accordingly, the 80 pieces of zero phase candidate voltage values are set so as to become "VzAC_rms>Vzdif_rms" of the equation (1-5), the above concept A is satisfied.

Figure 11:
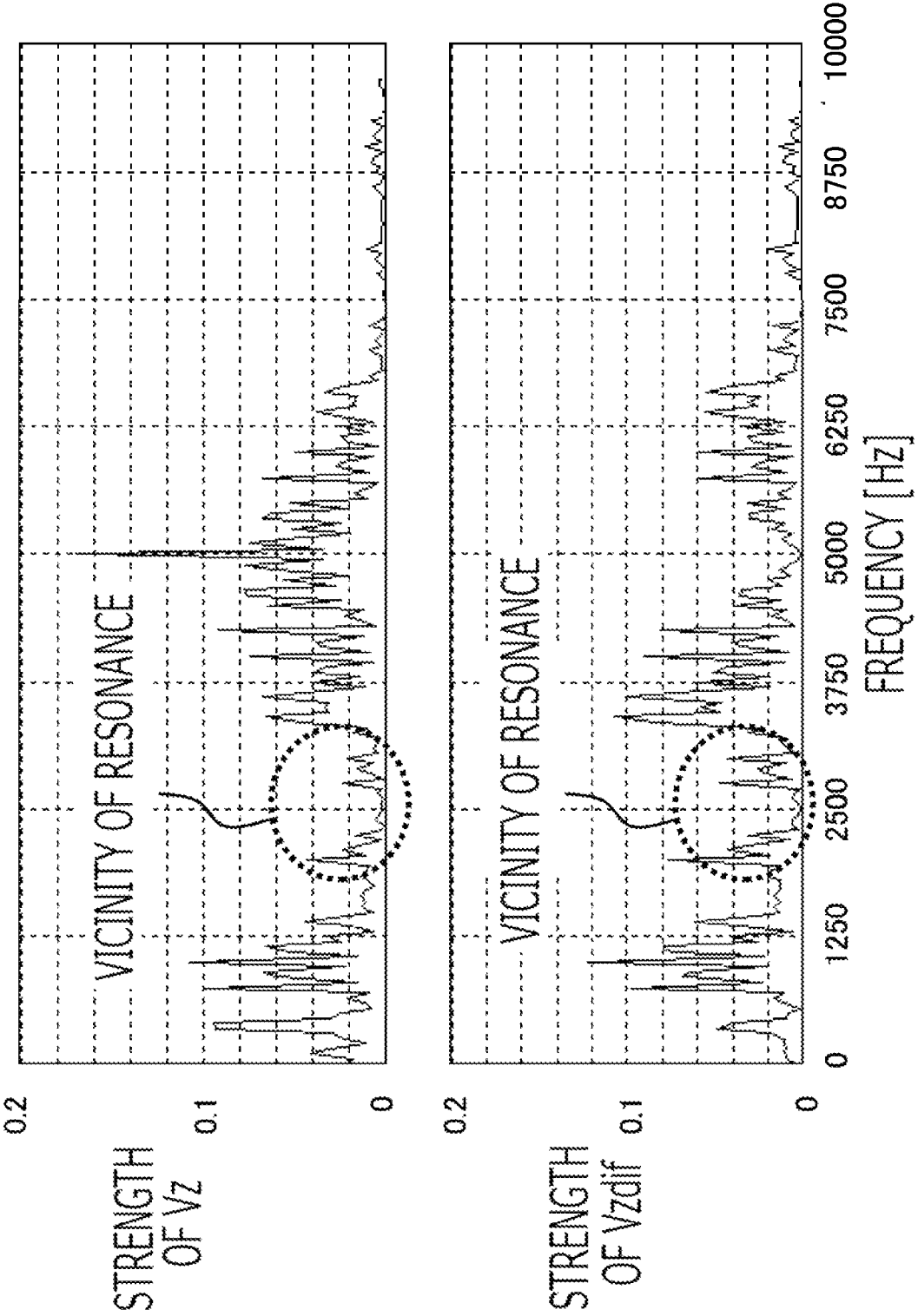
FIG. 11 is a figure showing the frequency analysis result of the zero phase voltage value and the zero phase time lag deviation value in the case of n=80 according to Embodiment 1.

The upper row of FIG. 11 shows the frequency analysis result of the zero phase voltage value Vz of the upper row of FIG. 10. The lower row of FIG. 11 shows the frequency analysis result of the zero phase time lag deviation value Vzdif of the lower row of FIG. 10. If the concept A is satisfied, as shown in FIG. 11, the component of the mechanical resonance frequency (the vicinity of 2500 Hz) included in the zero phase voltage value Vz and the zero phase time lag deviation value Vzdif becomes small. Accordingly, the component of the mechanical resonance period Tm of the AC rotary electric machine 1 included in the zero phase voltage value Vz can be reduced, and the unwanted sound of the AC rotary electric machine 1 can be reduced.

Next, as the setting example of the n pieces of zero phase candidate voltage values which do not satisfy the concept A, an example using seven pieces of zero phase candidate voltage values (Vzc_1=−0.75V, Vzc_2=−0.5V, Vzc_3=0V, Vzc_4=0.75V, Vzc_5=0.5V, Vzc_6=−0.25V, Vzc_7=0.25V) described in the patent document 3 (paragraphs 0036 to 0038) will be explained.

Figure 12:
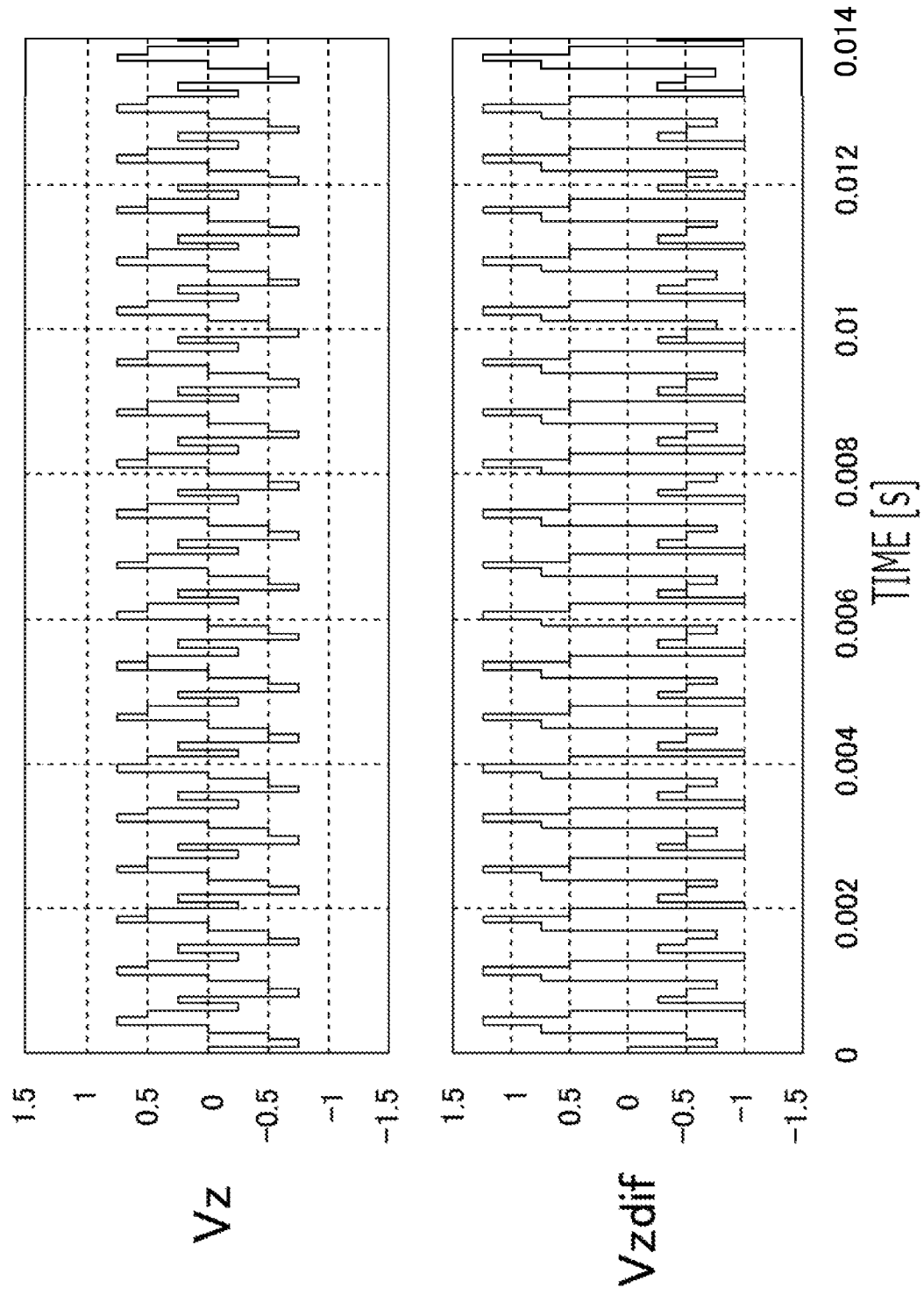
FIG. 12 is a time chart of the zero phase voltage value and the zero phase time lag deviation value according to the comparative example.

The upper row of FIG. 12 shows the zero phase voltage value Vz (t) when using the seven pieces of zero phase candidate voltage values of the patent document 3. The lower row of FIG. 12 shows the zero phase time lag deviation value Vzdif (t) obtained by subtracting the time lag zero phase voltage value Vz (t-200 μs) obtained by delaying the zero phase voltage value Vz (t) by 200 μs from the zero phase voltage value Vz (t). If the effective value VzAC_rms of the AC component of the zero phase voltage value Vz (t) of the patent document 3 of the upper row of FIG. 12 is calculated, VzAC_rms is 0.500V. On the other hand, the effective value Vzdif_rms of the zero phase time lag deviation value Vzdif(t) of the patent document 3 of the lower row of FIG. 12 is 0.7789V. Accordingly, it becomes "VzAC_rms<Vzdif_rms" and the above concept A is not satisfied.

Figure 13:
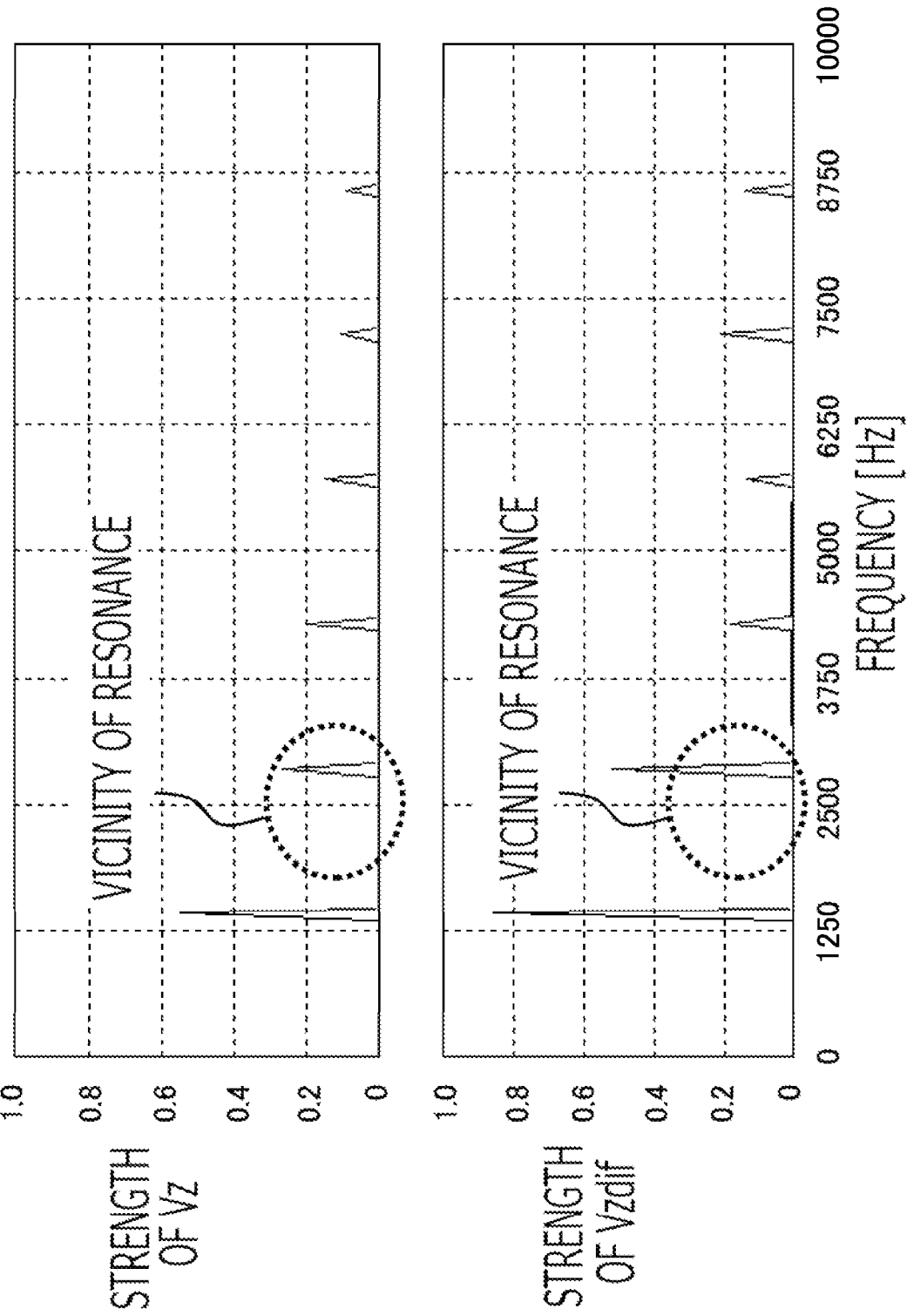
FIG. 13 is a figure showing the frequency analysis result of the zero phase voltage value and the zero phase time lag deviation value according to the comparative example.

The upper row of FIG. 13 shows the frequency analysis result of the zero phase voltage value Vz of the patent document 3 of the upper row of FIG. 12. The lower row of FIG. 13 shows the frequency analysis result of the zero phase time lag deviation value Vzdif of the patent document 3 of the lower row of FIG. 12. If the concept A is not satisfied, as shown in FIG. 13, the component of the mechanical resonance frequency (the vicinity of 2500 Hz) included in the zero phase voltage value Vz and the zero phase time lag deviation value Vzdif becomes large. Accordingly, the component of the mechanical resonance period Tm of the AC rotary electric machine 1 included in the zero phase voltage value Vz is large, and the unwanted sound of the AC rotary electric machine 1 becomes large.

Figure 14:
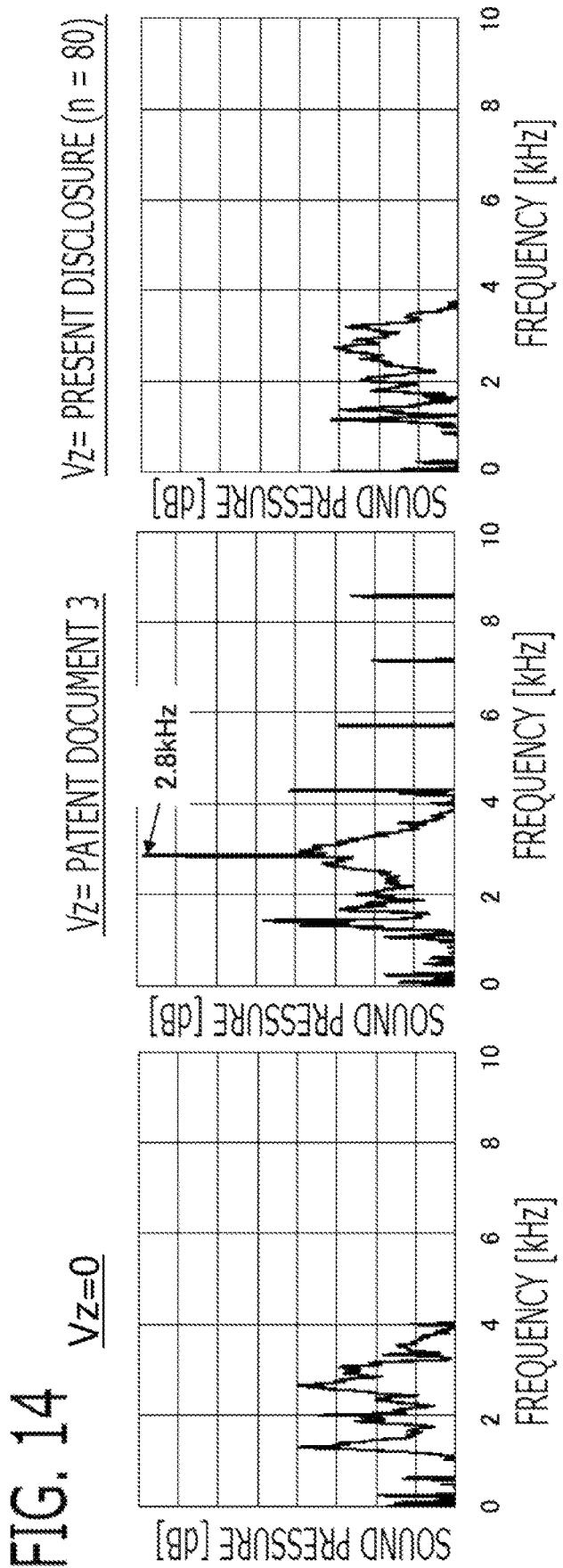
FIG. 14 is a figure showing the measured result of the sound level when changing setting of the zero phase voltage value according to Embodiment 1.

FIG. 14 shows the measured result of the sound level when changing the setting of the zero phase voltage value Vz in the AC rotary electric machine 1 for the electric power steering apparatus which has the sensitivity characteristic of FIG. 9. The left side of FIG. 14 is a case of the zero phase voltage value Vz (t)=0. The center of FIG. 14 is a case of the zero phase voltage value Vz (t) by the seven pieces of zero phase candidate voltage values of the patent document 3. The right side of FIG. 14 is a case of the zero phase voltage value Vz (t) by the 80 pieces of zero phase candidate voltage values of FIG. 4. In the case of the patent document 3 of the center of FIG. 14 in which the concept A is not satisfied, the unwanted sound is deteriorated compared with the case of the zero phase voltage value Vz=0 of left side (especially, at 2.8 kHz close to the mechanical resonance frequency). On the other hand, in the case of the present disclosure of the right side of FIG. 14 in which the concept A is satisfied, the unwanted sound is reduced as a whole compared with the case of the zero phase voltage value Vz=0 of left side, and also at the mechanical resonance frequency, the unwanted sound is not increased but is reduced.

Accordingly, by setting the n pieces of zero phase candidate voltage values so as to satisfy the concept A, and adding the zero phase voltage value Vz to the voltage command values of three-phase, the unwanted sound of the AC rotary electric machine 1 can be reduced in many frequency bands including the mechanical resonance frequency band of the AC rotary electric machine 1.

<First Modified Example of n Pieces of Zero Phase Candidate Voltage Values>

A modified example of then pieces of zero phase candidate voltage values will be explained. The n pieces of the zero phase candidate voltage values should be set so as to satisfy the concept A, it is not limited to the 80 pieces of zero phase candidate voltage values of FIG. 4. Hereinafter, concrete examples will be described.

Figure 15:
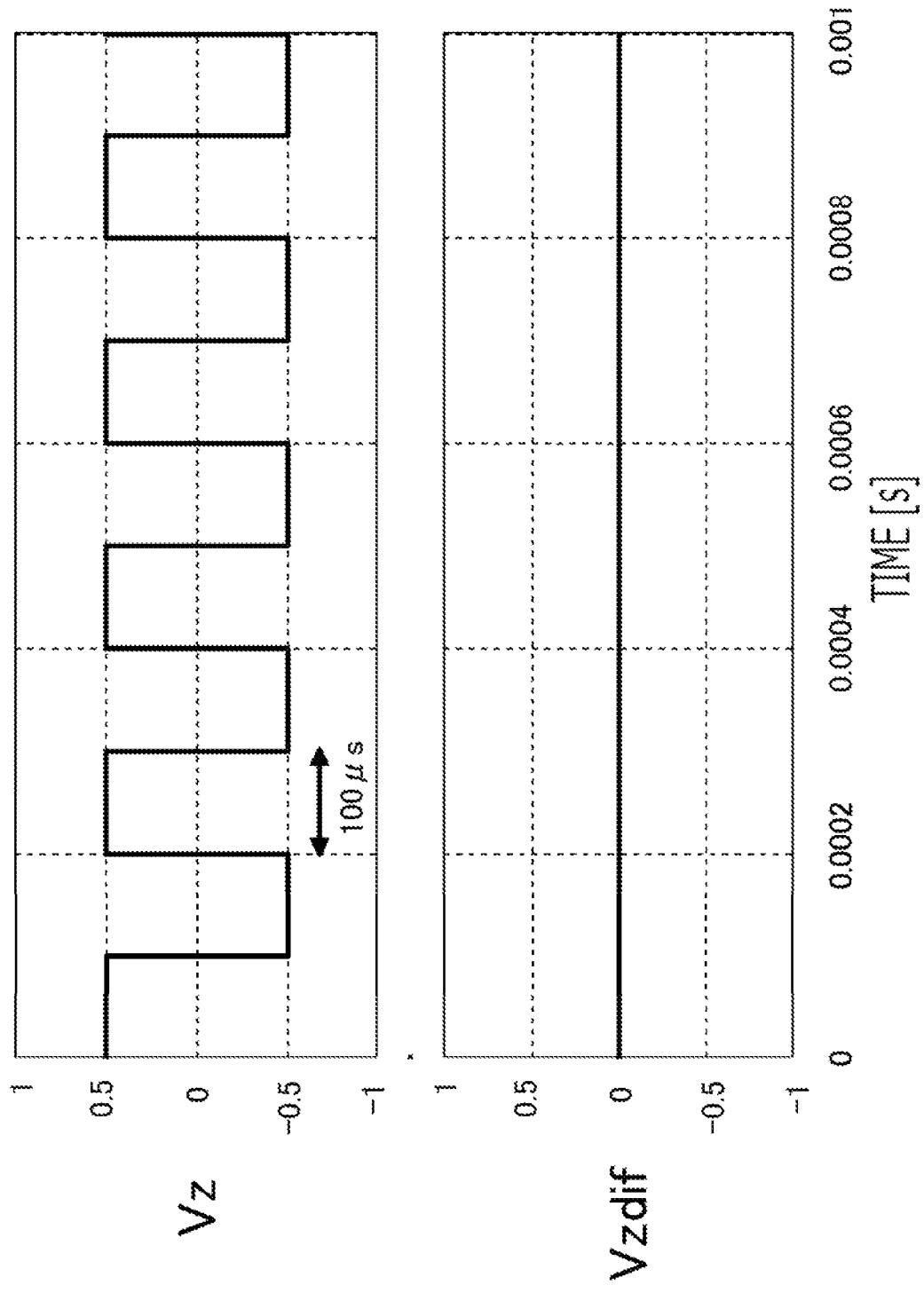
FIG. 15 is a time chart of the zero phase voltage value and the zero phase time lag deviation value in the case of n=2 according to Embodiment 1.

A case where it is set that n=2, the first zero phase candidate voltage value Vzc_1=−0.5V and the second zero phase candidate voltage value Vzc_1=0.5V will be explained. The upper row of FIG. 15 shows the zero phase voltage value Vz (t) obtained by outputting the two pieces of zero phase candidate voltage values Vzc_1, Vzc_2 in order at the switching period Tv=100 μs. The lower row of FIG. 16 shows the zero phase time lag deviation value Vzdif (t) obtained by subtracting the time lag zero phase voltage value Vz (t-200 μs) obtained by delaying the zero phase voltage value Vz (t) by the j times value of the switching period Tv (in this example, 100 μs×2=200 μs) from the zero phase voltage value Vz (t), in the case of j=2 to satisfy the concept A.

The effective value VzAC_rms of the AC component of the zero phase voltage value Vz (t) of the upper row of FIG. 15 is 0.500V. The effective value Vzdif_rms of the zero phase time lag deviation value Vzdif(t) of the lower row of FIG. 15 is 0V. It becomes "VzAC_rms>Vzdif_rms" and the concept A is satisfied.

Figure 16:
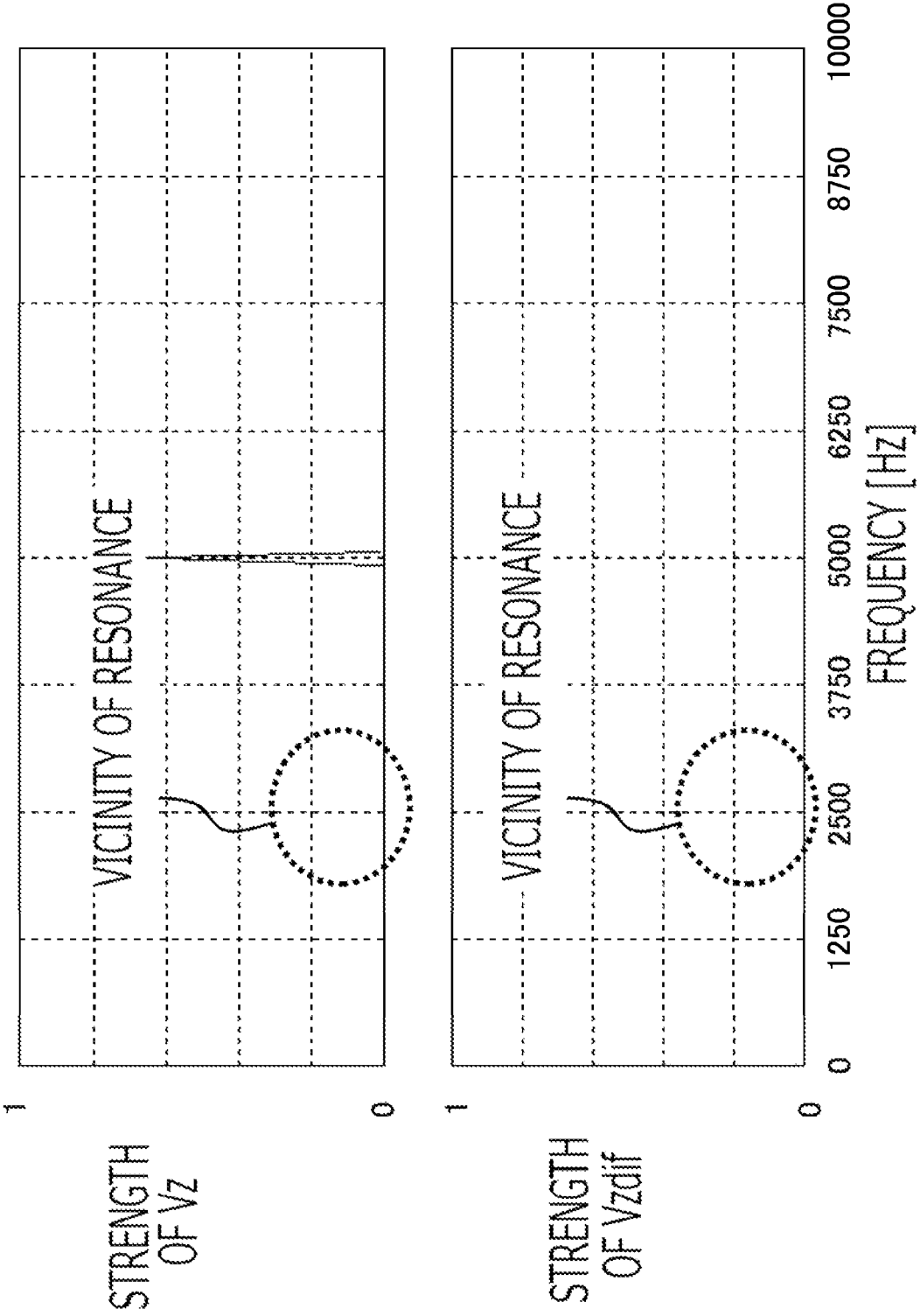
FIG. 16 is a figure showing the frequency analysis result of the zero phase voltage value and the zero phase time lag deviation value in the case of n=2 according to Embodiment 1.

The upper row of FIG. 16 shows the frequency analysis result of the zero phase voltage value Vz of the upper row of FIG. 15. The lower row of FIG. 16 shows the frequency analysis result of the zero phase time lag deviation value Vzdif of the lower row of FIG. 15. If the concept A is satisfied, as shown in FIG. 16, the component of the mechanical resonance frequency (the vicinity of 2500 Hz) included in the zero phase voltage value Vz and the zero phase time lag deviation value Vzdif becomes small. Accordingly, the component of the mechanical resonance period Tm of the AC rotary electric machine 1 included in the zero phase voltage value Vz can be reduced, and the unwanted sound of the AC rotary electric machine 1 can be reduced.

Figure 17:
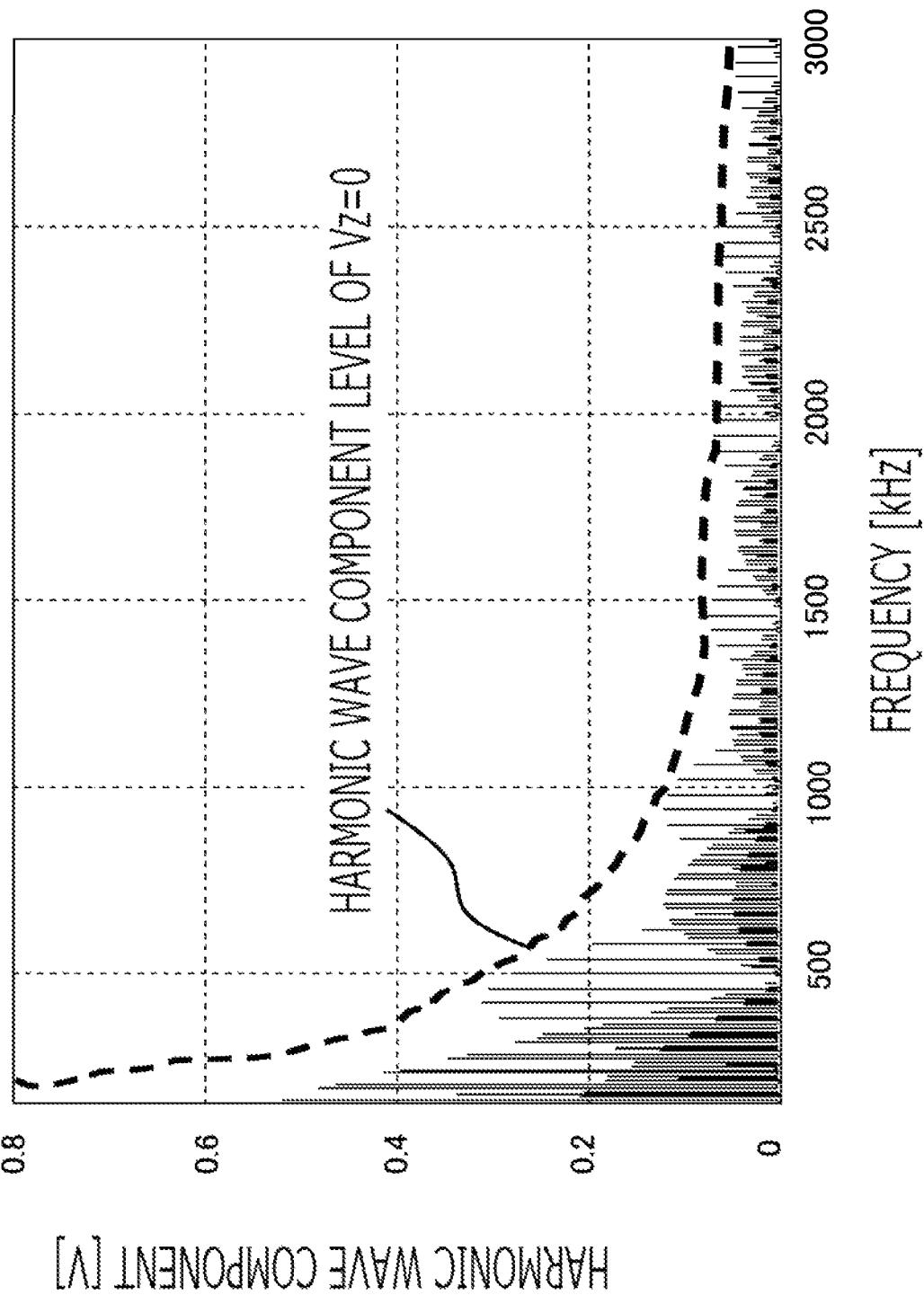
FIG. 17 is a figure showing the frequency analysis result of the applied voltage in the case of n=2 according to Embodiment 1.

FIG. 17 shows the frequency analysis result of the applied voltage Vu_PWM of U phase winding when adding the zero phase voltage value Vz by the two pieces of zero phase candidate voltage values. In FIG. 17, the dotted line shows a level of harmonic wave component when the zero phase voltage value Vz shown in FIG. 7 is not added. In this figure, since ON timing and OFF timing of the applied voltage are varied equally about all phase by addition of the zero phase voltage value Vz, the harmonic wave components are reduced in many bands of 150 kHz to 3000 kHz, and the noise generated from the inverter 4 can be reduced. Since the concept A is satisfied, the unwanted sound of the AC rotary electric machine 1 can be reduced in many frequency bands including the mechanical resonance frequency band of the AC rotary electric machine 1.

<Second Modified Example of n Pieces of Zero Phase Candidate Voltage Values>

FIG. 18 shows a setting example of 10 pieces of zero phase candidate voltage values Vzc_1 to Vzc_10, in the case of n=10. The zero phase voltage value calculation unit 33 selects from the first zero phase candidate voltage value Vzc_1 to the tenth zero phase candidate voltage value Vzc_10, in order for every switching period Tv, and calculates the selected zero phase candidate voltage value Vzc as the zero phase voltage value Vz. After the tenth zero phase candidate voltage value Vzc_10, the first zero phase candidate voltage value Vzc_1 is selected.

Figure 19:
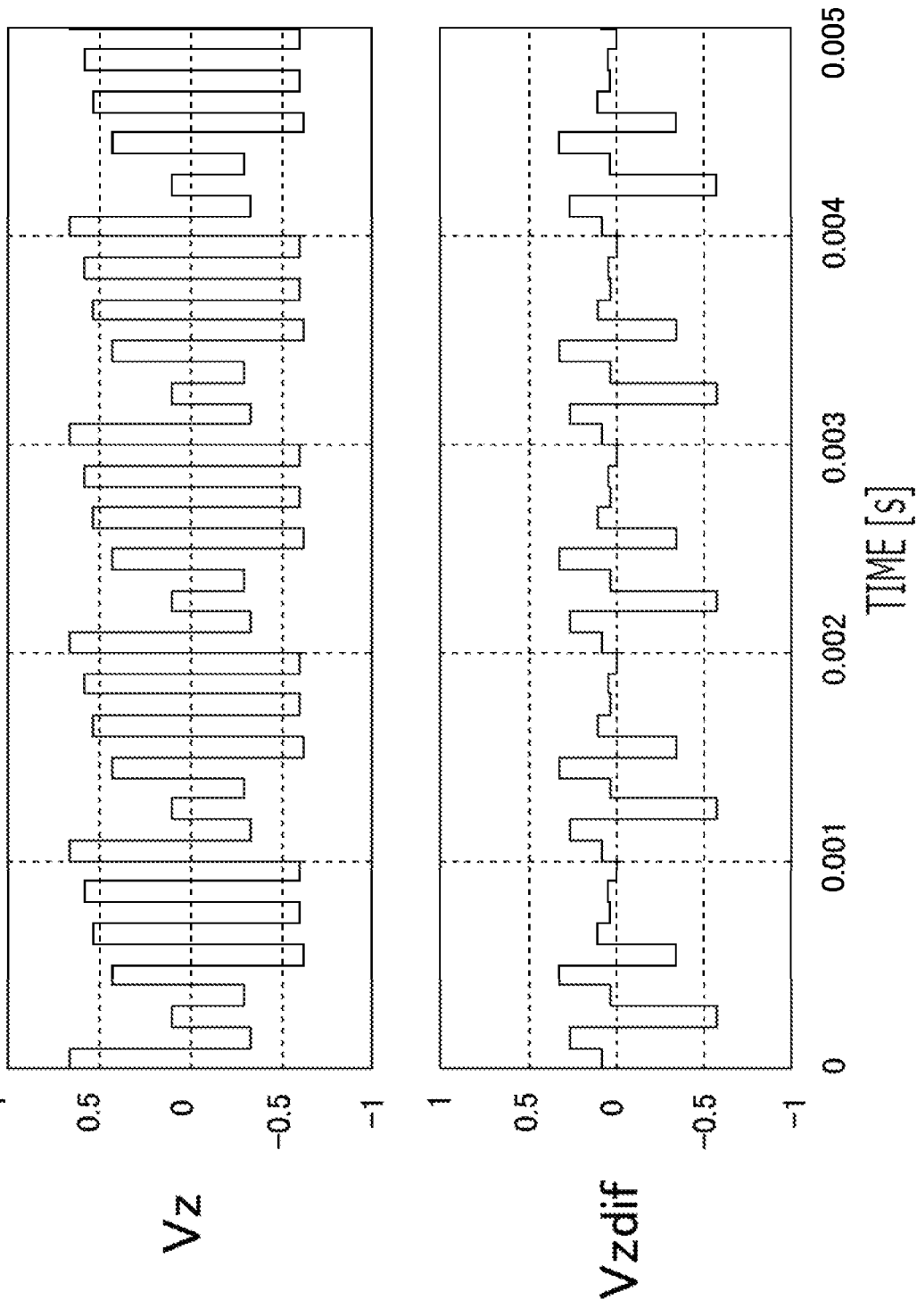
FIG. 19 is a time chart of the zero phase voltage value and the zero phase time lag deviation value in the case of n=10 according to Embodiment 1.

The upper row of FIG. 19 shows the zero phase voltage value Vz (t) obtained by outputting the 10 pieces of zero phase candidate voltage values Vzc_1 to Vzc_10 in order at the switching period Tv=100 μs. The lower row of FIG. 19 shows the zero phase time lag deviation value Vzdif (t) obtained by subtracting the time lag zero phase voltage value Vz (t-200 μs) obtained by delaying the zero phase voltage value Vz (t) by the j times value of the switching period Tv (in this example, 100 μs×2=200 μs) from the zero phase voltage value Vz (t), in the case of j=2 to satisfy the concept A.

The effective value VzAC_rms of the AC component of the zero phase voltage value Vz (t) of the upper row of FIG. 19 is 5.07V. The effective value Vzdif_rms of the two point five three phase time lag deviation value Vzdif(t) of the lower row of FIG. 19 is 2.53V. It becomes "VzAC_rms>Vzdif_rms" and the concept A is satisfied.

Figure 20:
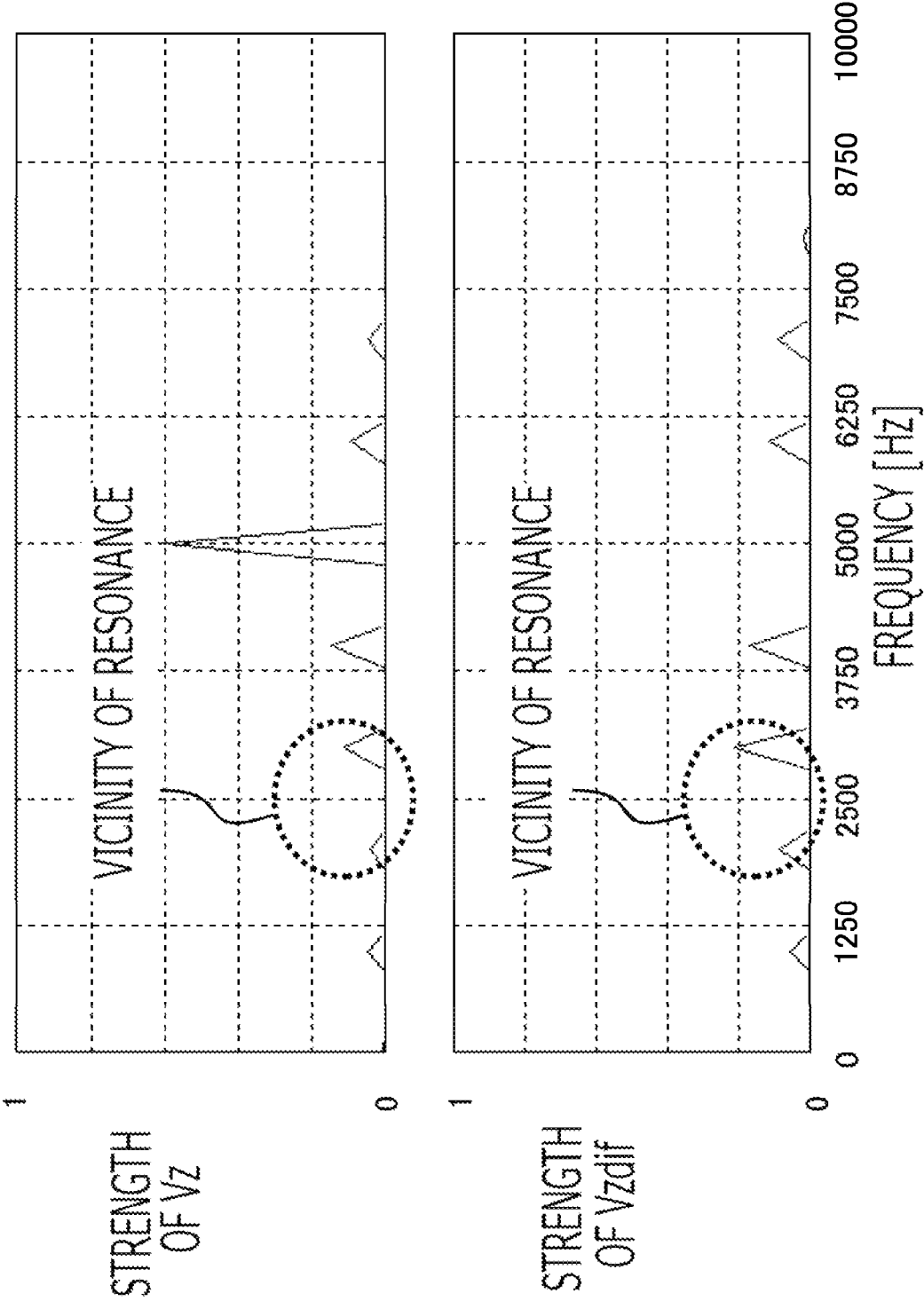
FIG. 20 is a figure showing the frequency analysis result of the zero phase voltage value and the zero phase time lag deviation value in the case of n=10 according to Embodiment 1.

The upper row of FIG. 20 shows the frequency analysis result of the zero phase voltage value Vz of the upper row of FIG. 19. The lower row of FIG. 20 shows the frequency analysis result of the zero phase time lag deviation value Vzdif of the lower row of FIG. 19. If the concept A is satisfied, as shown in FIG. 20, the component of the mechanical resonance frequency (the vicinity of 2500 Hz) included in the zero phase voltage value Vz and the zero phase time lag deviation value Vzdif becomes small. Accordingly, the component of the mechanical resonance period Tm of the AC rotary electric machine 1 included in the zero phase voltage value Vz can be reduced, and the unwanted sound of the AC rotary electric machine 1 can be reduced.

Figure 21:
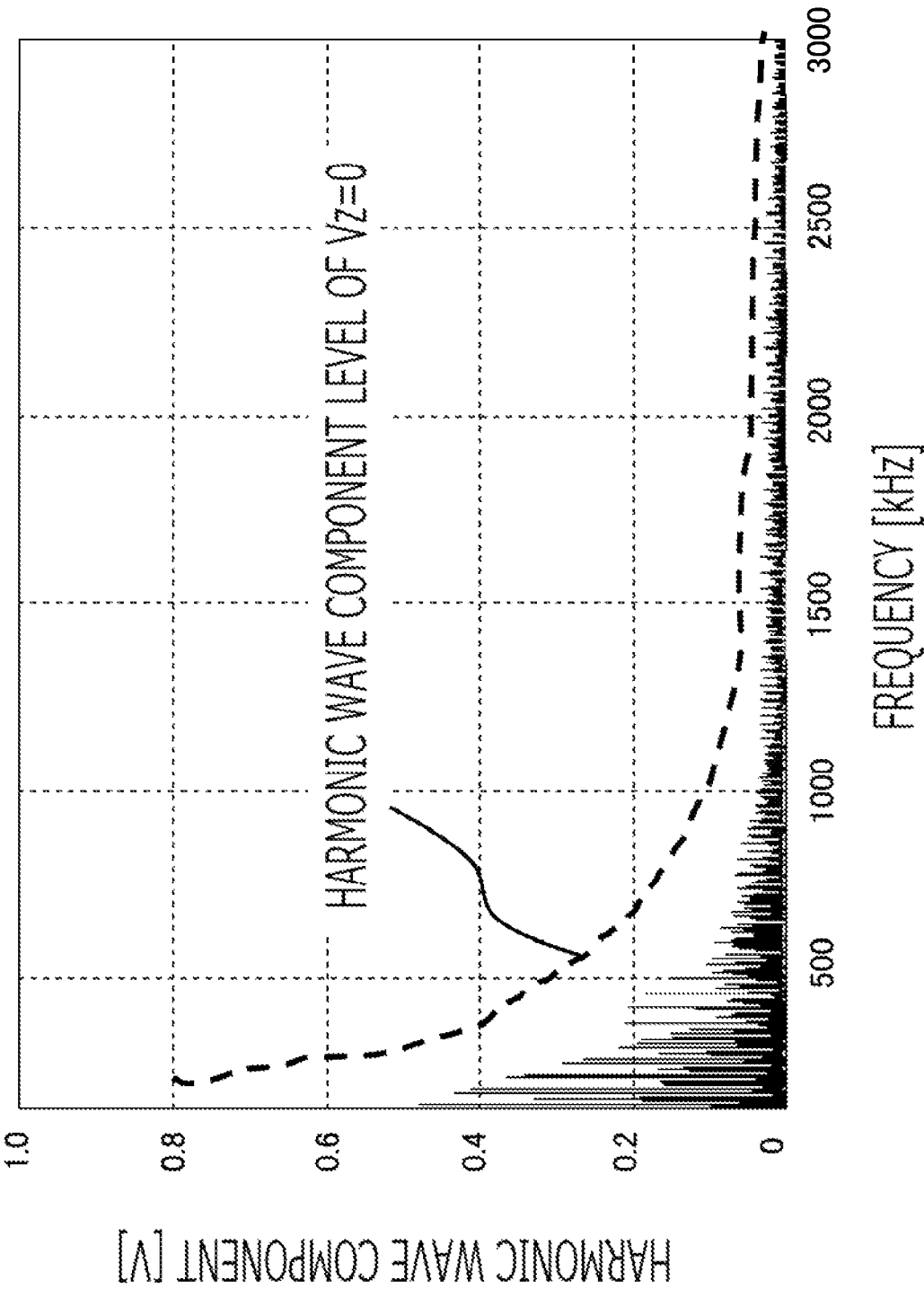
FIG. 21 is a figure showing the frequency analysis result of the applied voltage in the case of n=10 according to Embodiment 1.

FIG. 21 shows the frequency analysis result of the applied voltage Vu_PWM of U phase winding when adding the zero phase voltage value Vz by the 10 pieces of zero phase candidate voltage values. In FIG. 21, the dotted line shows a level of harmonic wave component when the zero phase voltage value Vz shown in FIG. 7 is not added. In this figure, since ON timing and OFF timing of the applied voltage are varied equally about all phase by addition of the zero phase voltage value Vz, the harmonic wave components are reduced in many bands of 150 kHz to 3000 kHz, and the noise generated from the inverter 4 can be reduced. Since the concept A is satisfied, the unwanted sound of the AC rotary electric machine 1 can be reduced in many frequency bands including the mechanical resonance frequency band of the AC rotary electric machine 1.

< The Third Modified Example of n Pieces of Zero Phase Candidate Voltage Values>

FIG. 22 shows a setting example of 40 pieces of zero phase candidate voltage values Vzc_1 to Vzc_40, in the case of n=40. The zero phase voltage value calculation unit 33 selects from the first zero phase candidate voltage value Vzc_1 to the fortieth zero phase candidate voltage value Vzc_40, in order for every switching period Tv, and calculates the selected zero phase candidate voltage value Vzc as the zero phase voltage value Vz. After the fortieth zero phase candidate voltage value Vzc_40, the first zero phase candidate voltage value Vzc_1 is selected.

Figure 23:
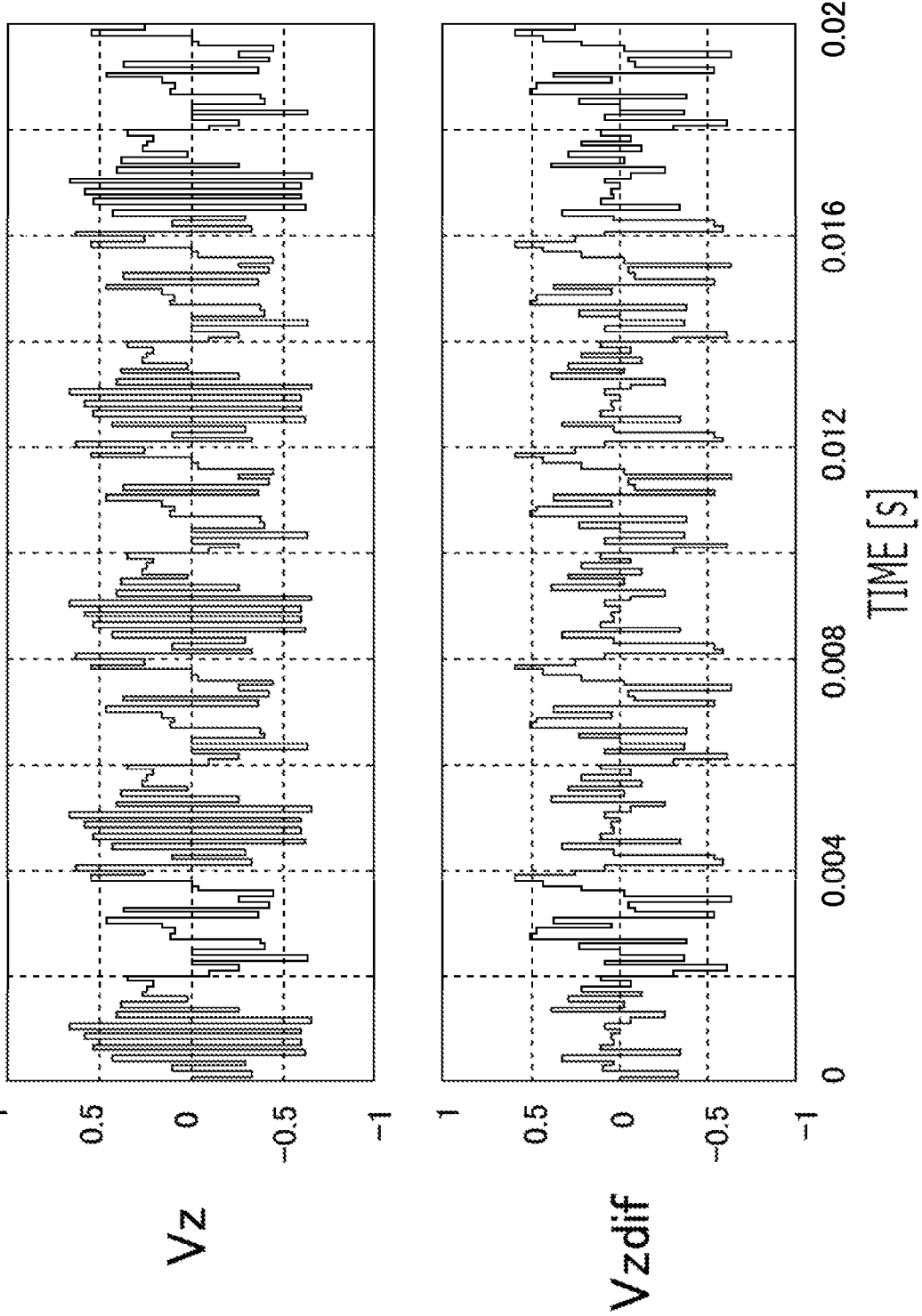
FIG. 23 is a time chart of the zero phase voltage value and the zero phase time lag deviation value in the case of n=40 according to Embodiment 1.

The upper row of FIG. 23 shows the zero phase voltage value Vz (t) obtained by outputting the 40 pieces of zero phase candidate voltage values Vzc_1 to Vzc_40 in order at the switching period Tv=100 μs. The lower row of FIG. 23 shows the zero phase time lag deviation value Vzdif (t) obtained by subtracting the time lag zero phase voltage value Vz (t-200 μs) obtained by delaying the zero phase voltage value Vz (t) by the j times value of the switching period Tv (in this example, 100 μs×2=200 μs) from the zero phase voltage value Vz (t), in the case of j=2 to satisfy the concept A.

The effective value VzAC_rms of the AC component of the zero phase voltage value Vz (t) of the upper row of FIG. 23 is 3.94V. The effective value Vzdif_rms of the two point five three phase time lag deviation value Vzdif(t) of the lower row of FIG. 23 is 3.18V. It becomes "VzAC_rms>Vzdif_rms" and the concept A is satisfied.

Figure 24:
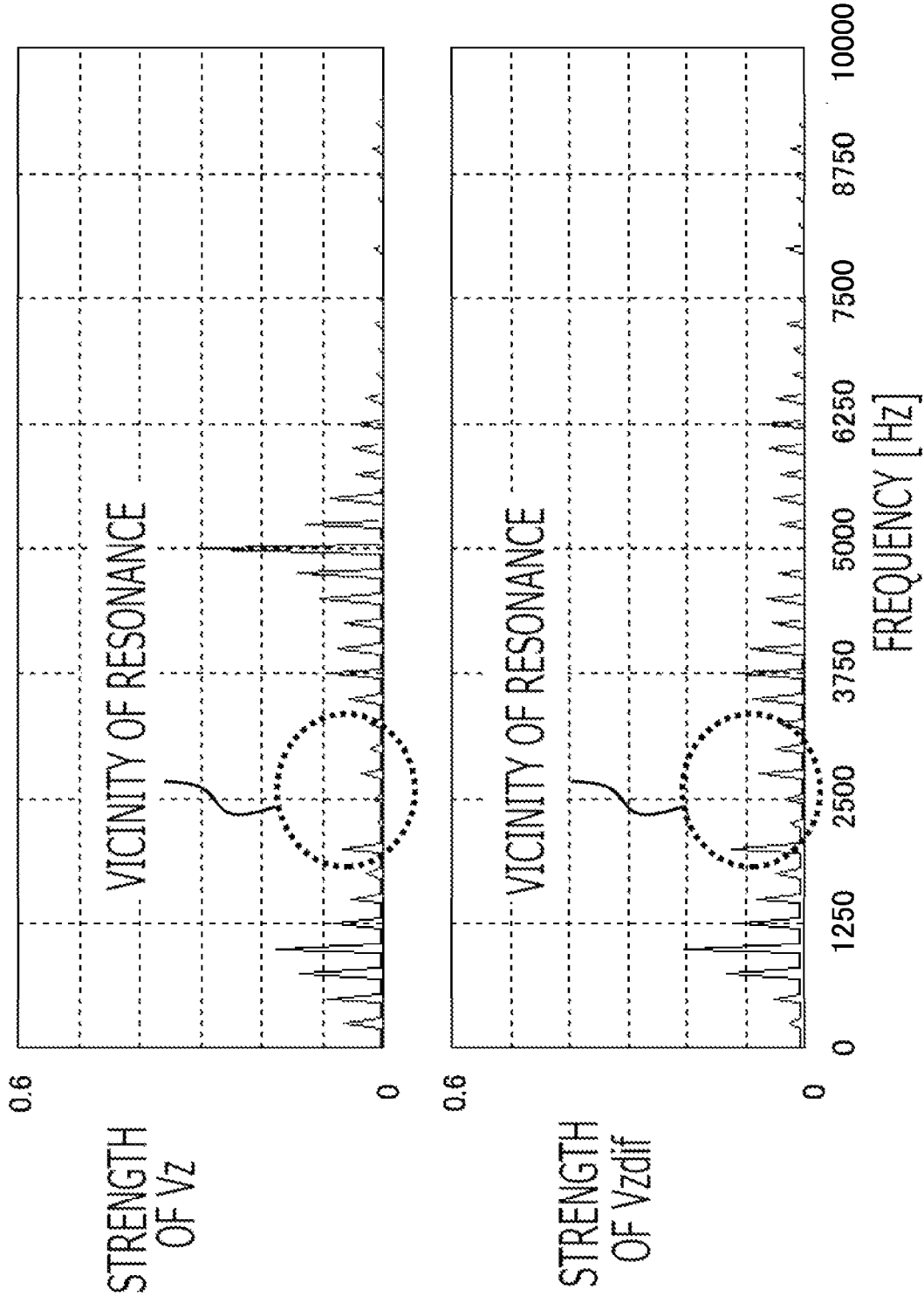
FIG. 24 is a figure showing the frequency analysis result of the zero phase voltage value and the zero phase time lag deviation value in the case of n=40 according to Embodiment 1.

The upper row of FIG. 24 shows the frequency analysis result of the zero phase voltage value Vz of the upper row of FIG. 23. The lower row of FIG. 24 shows the frequency analysis result of the zero phase time lag deviation value Vzdif of the lower row of FIG. 23. If the concept A is satisfied, as shown in FIG. 24, the component of the mechanical resonance frequency (the vicinity of 2500 Hz) included in the zero phase voltage value Vz and the zero phase time lag deviation value Vzdif becomes small. Accordingly, the component of the mechanical resonance period Tm of the AC rotary electric machine 1 included in the zero phase voltage value Vz can be reduced, and the unwanted sound of the AC rotary electric machine 1 can be reduced.

Figure 25:
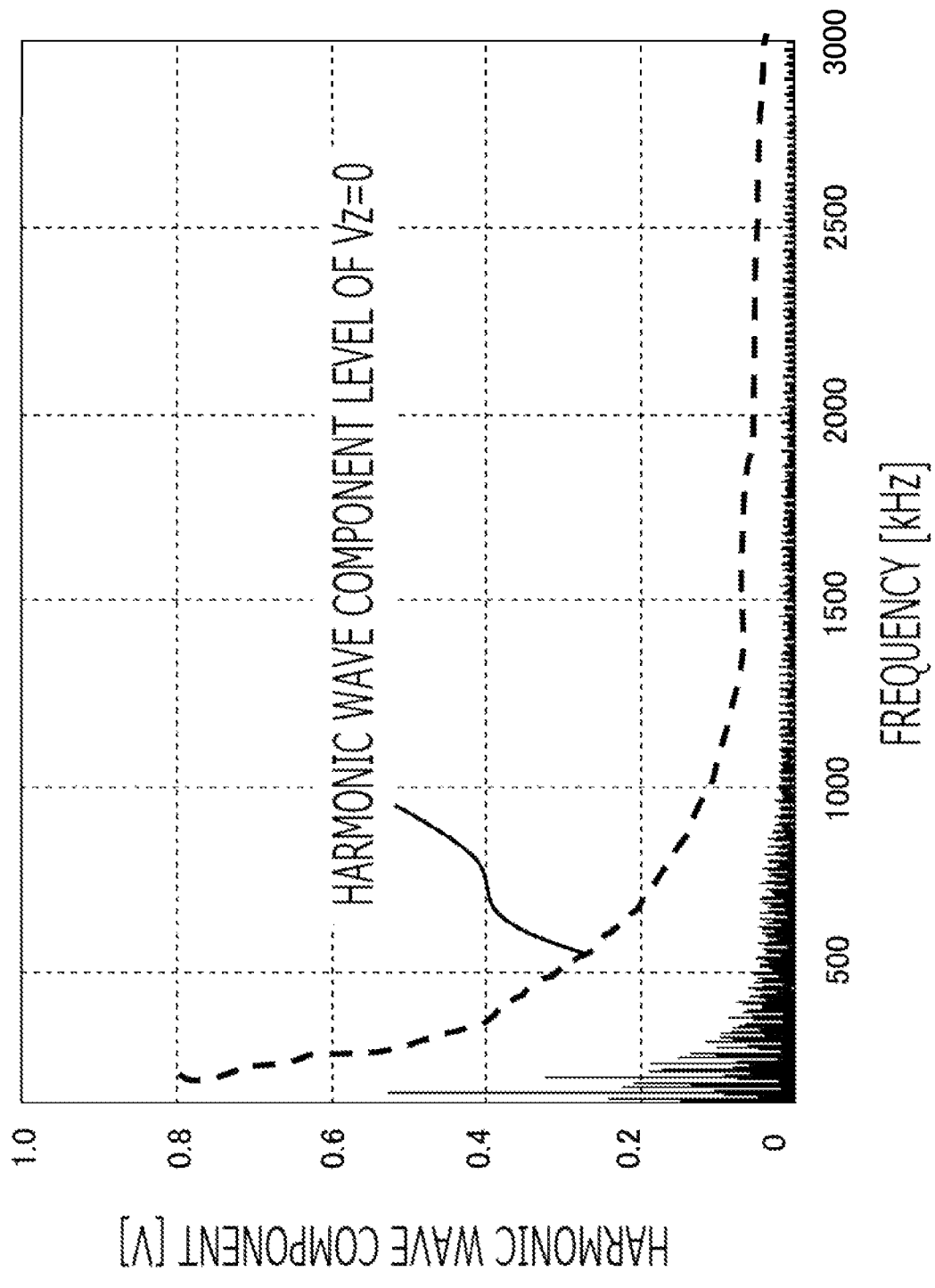
FIG. 25 is a figure showing the frequency analysis result of the applied voltage in the case of n=40 according to Embodiment 1.

FIG. 25 shows the frequency analysis result of the applied voltage Vu_PWM of U phase winding when adding the zero phase voltage value Vz by the 40 pieces of zero phase candidate voltage values. In FIG. 25, the dotted line shows a level of harmonic wave component when the zero phase voltage value Vz shown in FIG. 7 is not added. In this figure, since ON timing and OFF timing of the applied voltage are varied equally about all phase by addition of the zero phase voltage value Vz, the harmonic wave components are reduced in many bands of 150 kHz to 3000 kHz, and the noise generated from the inverter 4 can be reduced. Since the concept A is satisfied, the unwanted sound of the AC rotary electric machine 1 can be reduced in many frequency bands including the mechanical resonance frequency band of the AC rotary electric machine 1.

SUMMARY

In the above, the plurality of concrete examples were described. The purpose of present disclosure is coexistence of reducing the noise (EMI) generated from the inverter 4, and reducing the unwanted sound of the AC rotary electric machine 1. For that purpose, in the present disclosure, by setting the n pieces of zero phase candidate voltage values so that the concept A is satisfied. The component of the mechanical resonance period Tm of the AC rotary electric machine 1 included in the zero phase voltage value Vz and the zero phase time lag deviation value Vzdif can be reduced, and the unwanted sound of the AC rotary electric machine 1 can be reduced. According to the plurality of concrete examples, as n becomes large, the component of 150 kHz to 3000 kHz included in the applied voltage of winding tends to be reduced.

Accordingly, when performing the present disclosure, first of all, the n pieces of zero phase candidate voltage values are determined so as to satisfy the concept A, and the component of the mechanical resonance period Tm of the AC rotary electric machine 1 included in the zero phase voltage value Vz is made small. On that basis, the component of 150 kHz to 3000 kHz included in the applied voltage of winding should satisfy the specification. However, when not satisfied, after increasing n, it may be confirmed again whether or not the specification is satisfied. But, n requires at least two pieces.

<Adjustment of Amplitude of n Pieces of Zero Phase Candidate Voltage Values>

Figure 26:
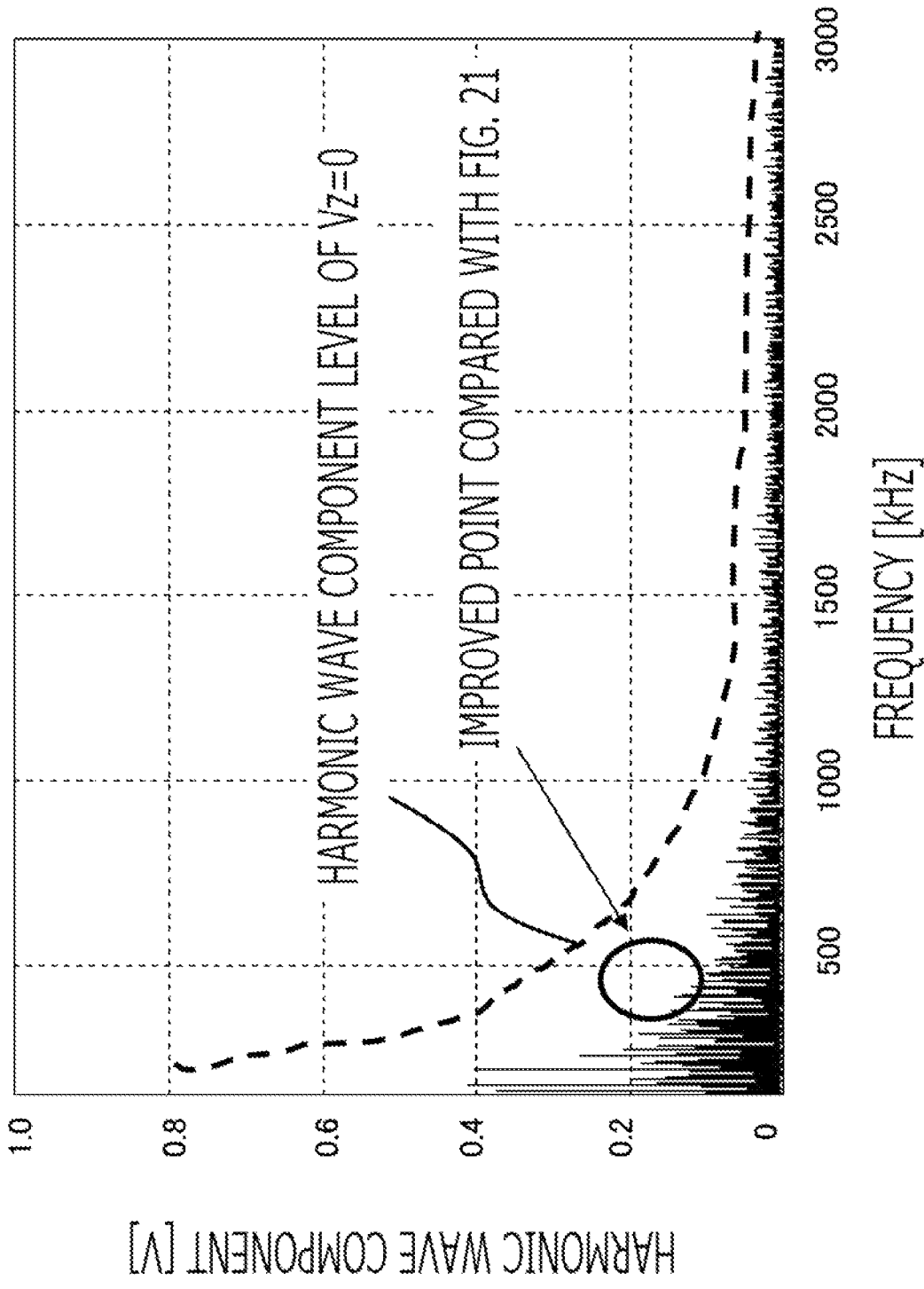
FIG. 26 is a figure showing the frequency analysis result of the applied voltage in the case of n=10 and double amplitude according to Embodiment 1.

In addition to the increase in n, it is also effective to adjust the amplitude of n pieces of zero phase candidate voltage values. FIG. 26 shows the frequency analysis result of applied voltage of U phase winding Vu_PWM when doubling all of ten pieces of zero phase candidate voltage values shown in FIG. 18 and using them. Compared with FIG. 21 which is not doubled, in FIG. 26 which is doubled, the harmonic wave component in the vicinity of 300 kHz to 500 kHz is reduced. Accordingly, it is effective for adjustment of the noise level to adjust the amplitude of n pieces of zero phase candidate voltage values.

As a rough guideline, in order to reduce LW band (150 kHz to 500 kHz) sufficiently, the n pieces of zero phase candidate voltage values may be preliminarily set so that a difference between the maximum value of the n pieces of zero phase candidate voltage values and the minimum value of the n pieces of zero phase candidate voltage values become greater than or equal to 10% of the DC voltage Vdc supplied to the inverter.

In order to reduce AM band (500 kHz to 1730 kHz) sufficiently, the n pieces of zero phase candidate voltage values may be preliminarily set so that a difference between the maximum value of the n pieces of zero phase candidate voltage values and the minimum value of the n pieces of zero phase candidate voltage values become greater than or equal to 5% of the DC voltage Vdc supplied to the inverter.

<Setting of Each Period>

The mechanical resonance period Tm of the AC rotary electric machine 1 for the electric power steering apparatus of the present disclosure is in a range greater than or equal to 200 μs and less than or equal to 500 μs (the mechanical resonance frequency is greater than or equal to 2 kHz and less than or equal to 5 kHz). More preferably, the mechanical resonance period Tm is in a range greater than or equal to 300 μs and less than or equal to 400 μs (the mechanical resonance frequency is greater than or equal to 2.5 kHz and less than or equal to 3.3 kHz). If the PWM period Tc is less than or equal to 60 μs and greater than or equal to 6.67 μs, it is preferable to use for the electric power steering apparatus 100 which reduces the noise and reduces the unwanted sound of the AC rotary electric machine 1. If the PWM periods Tc are less than or equal to 60 μs and greater than or equal to 6.67 μs, the PWM frequency (1/Tc) becomes greater than or equal to 16 kHz and less than or equal to 150 kHz. The noise reduction effect is deteriorated in greater than or equal to 150 kHz.

And, the unwanted sound of human audible range is deteriorated in less than 16 kHz, since the sound component of the PWM frequency of the AC rotary electric machine 1 is outstanding.

2. Embodiment 2

Figure 27:
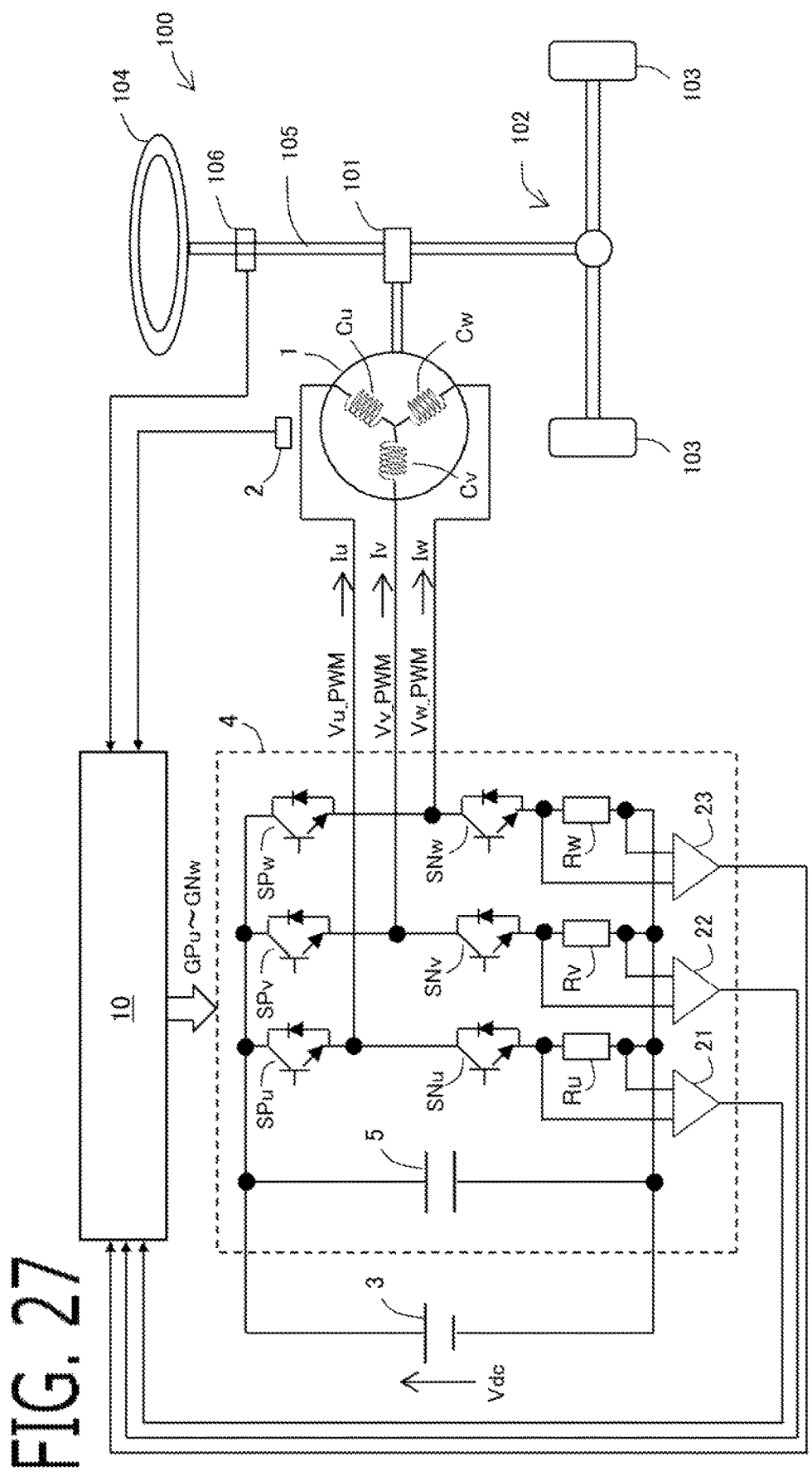
FIG. 27 is a schematic configuration diagram of the AC rotary electric machine, the inverter, and the controller according to Embodiment 2.

The AC rotary electric machine 1, the inverter 4, and the controller 10 according to Embodiment 2 will be explained. The explanation for constituent parts the same as those in Embodiment 1 will be omitted. The basic configuration of the AC rotary electric machine 1, the inverter 4, and the controller 10 according to the present embodiment is the same as that of Embodiment 1. Embodiment 2 is different from Embodiment 1 in that the inverter 4 is provided with the current sensor and the controller 10 sets the voltage command values based on current detection. FIG. 27 is a schematic configuration diagram of an AC rotary electric machine 1, an inverter 4, and the controller 10 according to the present embodiment.

The series circuit of three-phase of the inverter 4 is provided with a resistor Ru of U phase, a resistor Rv of V phase, and a resistor Rw of W phase connected in series to the negative electrode side switching device SN of each phase. The resistor Ru, Rv, Rw of each phase is connected in series to the negative electrode side of the negative electrode side switching device SN. In the present embodiment, the resistors Ru, Rv, Rw of three-phase are a shunt resistor for current detection, both ends potential difference of the resistor of each phase is detected by an amplifier 21, 22, 23, and the both ends potential difference is inputted into the controller 10. Accordingly, the inverter 4 of the present embodiment is the inverter of the so-called lower arm three-shunt system.

The resistor of each phase may be connected in series to the positive electrode side switching device SP. Alternatively, the resistor may be connected in series to the positive electrode side bus line or the negative electrode side bus line which connects between the inverter 4 and the DC power source 3.

In the present embodiment, the voltage command calculation unit 32 detects a current Iud, Ivd, Iwd which flow into the winding of each phase, based on the both ends potential difference of the resistor Ru, Rv, Rw of each phase. Then, as shown in the next equation, the voltage command calculation unit 32 converts the current detection values of three-phase Iud, Ivd, Iwd into the current detection value of d-axis Idd and the current detection value of q-axis Iqd, by performing a three-phase/two-phase conversion and a rotating coordinate conversion based on the magnetic pole position θ.

[Equation 5]

$$\begin{bmatrix} Idd \\ Iqd \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix} \begin{bmatrix} Iud \\ Ivd \\ Iwd \end{bmatrix} \quad (2\text{-}1)$$

In the case where the resistor is connected in series to the positive electrode side bus line or the negative electrode side bus line which connects between the inverter 4 and the DC power source 3. The voltage command calculation unit 32 detects a bus current, based on the both ends potential difference of the resistor, and detects the winding current Iud, Ivd, Iwd of each phase, based on the on-off pattern of the switching devices of each phase at the time point of detecting the bus current, and the bus current, using the well-known method.

Similarly to Embodiment 1, the voltage command calculation unit 32 detects the steering wheel torque Ts of the driver, based on the output signal of the torque sensor 106. As shown in the equation (1-1), the voltage command calculation unit 32 sets the current command value of q-axis Iqo based on the steering torque Ts, and sets the current command value of d-axis Ido to 0.

Then, the voltage command calculation unit 32 changes the voltage command values of three-phase Vub, Vvb, Vwb so that the current detection values of d-axis and q-axis Idd, Iqd approach the current command values of d-axis and q-axis Ido, Iqo. As shown in the next equation, the voltage command calculation unit 32 changes the voltage command value of d-axis Vdo by PI control so that the current detection value of d-axis Idd approaches the current command value of d-axis Ido, and changes the voltage command value of q-axis Vqo by PI control so that the current detection value of q-axis Iqd approaches the current command value of q-axis Iqo. A feedforward control for non-interfering between the d-axis current and the q-axis current and the like may be performed.

[Equation 6]

$$Vdo = Kd\left(1 + \frac{1}{Td \times s}\right)(Ido - Idd) \quad (2\text{-}2)$$

$$Vqo = Kq\left(1 + \frac{1}{Tq \times s}\right)(Iqo - Iqd)$$

Herein, Kd and Kq are proportional gains, Td and Tq are integral time constants, and s is a Laplace operator.

Then, similarly to Embodiment 1, as shown in the equation (1-3), the voltage command calculation unit 32 converts the current command values of d-axis and q-axis Vdo, Vqo into the voltage command values of three-phase Vub, Vvb, Vwb, by performing a fixed coordinate conversion and a two-phase/three-phase conversion based on the magnetic pole position θ.

Similarly to Embodiment 1, the zero phase voltage value calculation unit 33 switches n pieces (n is a natural number greater than or equal to two) of zero phase candidate voltage values Vzc_1 to Vzc_n whose values are different with each other, in order, for every switching period Tv, and calculates as a zero phase voltage value Vz. The n pieces of zero phase candidate voltage valuesVzc_1 to Vzc_n are preliminarily set so that the concept A is satisfied.

Similarly to Embodiment 1, the voltage command correction unit 34 corrects the voltage command values of three-phase Vub, Vvb, Vwb, based on the zero phase voltage value Vz. As shown in the equation (1-4), the voltage command correction unit 34 calculates the voltage command values of three-phase after correction Vus, Vvc, Vwc by adding the zero phase voltage value Vz to each of the voltage command values of three-phase Vub, Vvb, Vwb.

Similarly to Embodiment 1, the PWM control unit 35 controls on/off of the plurality of switching devices of the inverter 4, based on the voltage command values of three-phase after correction Vuc, Vvc, Vwc.

<Current Detection Timing>

The current detection timing based on the both ends potential difference of the resistor will be explained. In the series circuit of U phase, when the negative electrode side switching device SNu is ON, the current flows into the resistor Ru of U phase, and the current which flows through the resistor becomes equal to the current Iu which flows into the winding Cu of U phase. Accordingly, detection of the winding current Iu of U phase can be performed at arbitrary timing, when the negative electrode side switching device SNu of U phase is ON. Similarly, detection of the winding current Iv of V phase can be performed at arbitrary timing, when the negative electrode side switching device SNv of V phase is ON. Detection of the winding current Iw of W phase can be performed at arbitrary timing, when the negative electrode side switching device SNw of W phase is ON.

Figure 28:
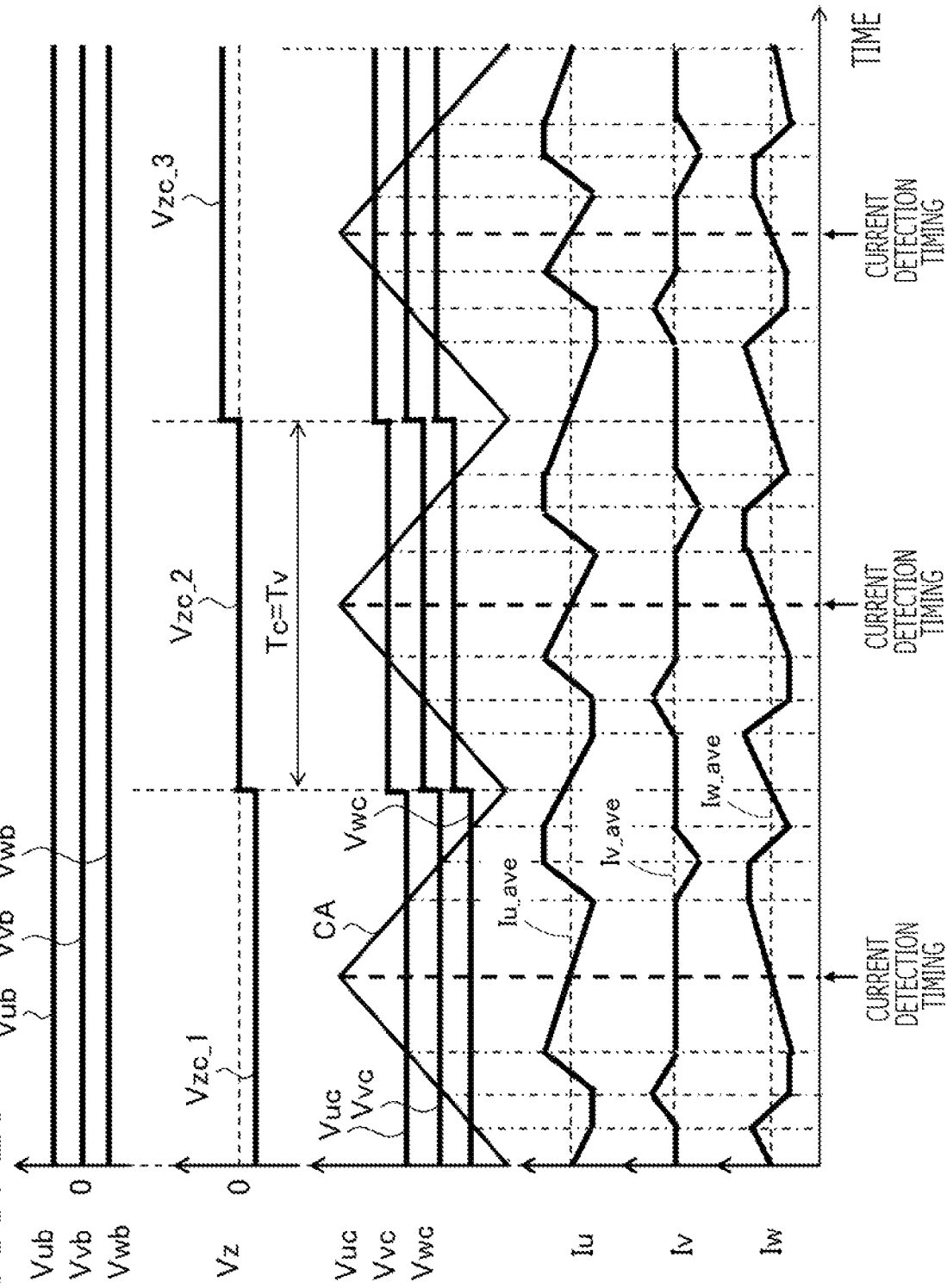
FIG. 28 is a time chart explaining PWM control and current detection according to Embodiment 2.

However, in the present embodiment, as shown in FIG. 28, the voltage command calculation unit 32 detects the current Iud, Ivd, Iwd which flows into the winding of each phase, based on the both ends potential difference of the resistor Ru, Rv, Rw of each phase, at the timing of the peak point of mountain of the carrier wave. If the resistor Ru, Rv, Rw of each phase is connected in series to the positive electrode side switching device, the voltage command calculation unit 32 detects the current Iud, Ivd, Iwd which flows into the winding of each phase, based on the both ends potential difference of the resistor Ru, Rv, Rw of each phase, at the timing of the peak point of valley of the carrier wave.

Hereinafter, its influence will be explained. FIG. 28 shows the control behavior during three periods of the PWM period Tc. Similarly to Embodiment 1, the switching period Tv of the zero phase voltage value Vz is set to be the same as the PWM period Tc. And, the zero phase voltage value Vz is switched at the timing of the peak point of valley of the carrier wave CA. In FIG. 28, the first zero phase candidate voltage value Vzc_1, the second zero phase candidate voltage value Vzc_2, and the third zero phase candidate voltage value Vzc_3 are set as the zero phase voltage value Vz in order for every switching period Tv. The voltage command values of three-phase Vub, Vvb, Vwb are set to different values. Accordingly, the voltage command values of three-phase after addition Vuc, Vvc, Vwc of the zero phase voltage value Vz become different values, and are changing according to the change of the zero phase voltage value Vz for every switching period Tv.

FIG. 28 shows the current Iu which flows into the winding of U phase, the current Iv which flows into the winding of V phase, and the current Iw which flows into the winding of W phase. A moving average value Iu_ave, Iv_ave, Iw_ave of the current Iu, Iv, Iw of each phase in the PWM periods Tc is shown. The winding current Iu, Iv, Iw of each phase include a ripple component with respect to the average value Iu_ave, Iv_ave, Iw_ave of the winding current of each phase. However, at the peak point of mountain (or the peak point of valley) of the carrier wave CA, the winding current Iu, Iv, Iw of each phase coincide with the average value Iu_ave, Iv_ave, Iw_ave of the winding current of each phase. Accordingly, by setting the current detection timing to the peak point of mountain of the carrier wave CA, a fundamental wave component of the rotation period can be detected from the winding current including the ripple component.

Especially, in control of the AC rotary electric machine 1 for the electric power steering apparatus, it is desirable to detect the winding current with high accuracy. If an error with respect to the true value of winding current occurs in the detection value of winding current, it is controlled so that the detection value of the winding current which has the error with respect to the true value coincides with the current command value, and a torque ripple is generated in the output torque of the AC rotary electric machine 1. The torque ripple is transmitted to the handle 104 via the shaft 105, and worsens the steering feeling of the driver.

By setting the current detection timing to the peak point of mountain of the carrier wave CA, its fundamental wave can be detected from the winding current including the ripple component. Accordingly, winding current can be detected with high accuracy, generation of the torque ripple by the current detection error is suppressed, and the good handle steering feeling of the driver is obtained.

Next, an advantage of connecting the resistor R in series to the negative electrode side switching device SN and setting the n pieces of zero phase candidate voltage values by the concept A will be explained.

<Influence on Winding Current if not Providing Resistor R>

Figure 29:
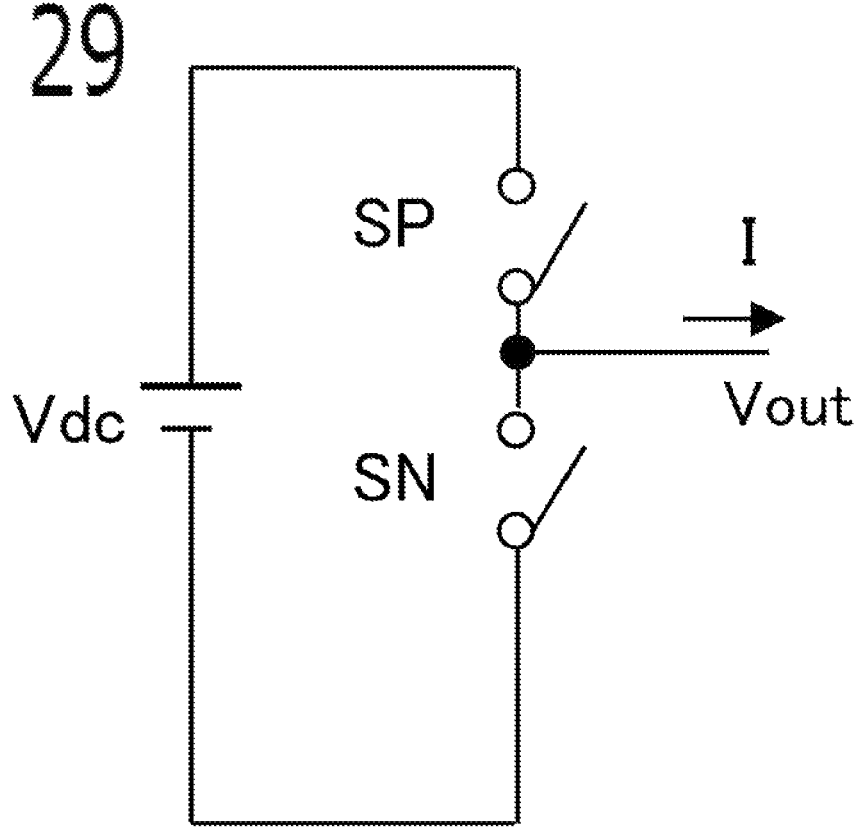
FIG. 29 is a figure showing the equivalent circuit of the series circuit of one phase if not providing resistor according to Embodiment 2.

FIG. 29 shows an equivalent circuit of the series circuit of one phase of the inverter 4 if not providing the resistor R. The positive electrode side switching device SP and the negative electrode side switching device SN are expressed by switches, and the conduction resistance is ignored. There is an output terminal connected to the winding of the corresponding phase in the middle of the positive electrode side switching device SP and the negative electrode side switching device SN, and a potential Vout of the output terminal becomes the applied voltage of winding.

Herein, if a ratio of on period of the positive electrode side switching device SP in the PWM period Tc is defined as D, the average value Vout_ave of the potential Vout of the output terminal in the PWM period Tc can be expressed by the next equation.

$$Vout\_ave = D \times Vdc \quad (2\text{-}3)$$

Similarly, if a ratio of on period of the positive electrode side switching device SPu of U phase is defined as Du, and a ratio of on period of the positive electrode side switching device SPv of V phase is defined as Dv, the average value Voutu_ave of the output terminal potential of the series circuit of U phase and the average value Voutv_ave of the output terminal potential of the series circuit of V phase can be expressed by the next equation.

$$Voutu\_ave = Du \times Vdc$$

$$Voutv\_ave = Dv \times Vdc \quad (2\text{-}4)$$

Herein, if the zero phase voltage value Vz is added to the condition of the equation (2-4), and a variation amount of the ratio of on period of each phase by the addition of the zero phase voltage value Vz is defined as ΔD, it can be expressed by the next equation.

$$Voutu\_ave = (Du + \Delta D) \times Vdc$$

$$Voutv\_ave = (Dv + \Delta D) \times Vdc \quad (2\text{-}5)$$

From the equation (2-5), a line voltage ΔVout_uv between U phase and V phase can be expressed by the next equation.

$$\Delta Vout\_uv = Voutu\_ave - Voutv\_ave = (Du - Dv) \times Vdc \quad (2\text{-}6)$$

As shown in this equation, the influence of addition of the zero phase voltage value Vz does not occur in the line voltage. If the resistor R is not provided, since the winding current of the AC rotary electric machine 1 flows according to the line voltage, the influence of the zero phase voltage value Vz does not appear in the winding current.

<Influence on Winding Current if Providing Resistor R>

Figure 30:
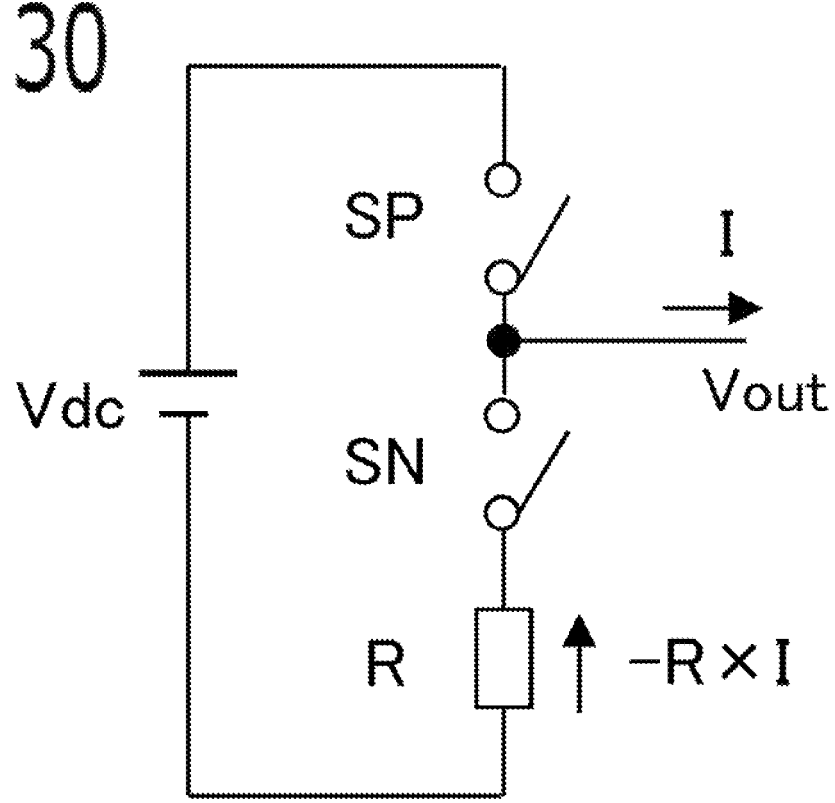
FIG. 30 is a figure showing the equivalent circuit of the series circuit of one phase if providing resistor according to Embodiment 2.

FIG. 30 shows an equivalent circuit of the series circuit of one phase of the inverter 4 if providing the resistor R. In addition to FIG. 29, the resistor R is connected in series to the negative electrode side of the negative electrode side switching device SN. There is an output terminal connected to the winding of the corresponding phase in the middle of the positive electrode side switching device SP and the negative electrode side switching device SN, and a potential Vout of the output terminal becomes the applied voltage of winding.

A voltage drop occurs when the winding current I flows through the resistor R, and the average value Vout_ave of the potential Vout of the output terminal in the PWM period Tc can be expressed by the next equation. Herein, a resistance value of the resistor R is expressed by R.

$$Vout\_ave = D \times Vdc + (1-D) \times (-R \times I) \quad (2\text{-}7)$$

Similarly, if the ratio of on period of the positive electrode side switching device SPu of U phase is defined as Du, the ratio of on period of the positive electrode side switching device SPv of V phase is defined as Dv, the winding current of U phase is defined as Iu, and the winding current of V phase is defined as Iv, the average value Voutu_ave of the output terminal potential of the series circuit of U phase and the average value Voutv_ave of the output terminal potential of the series circuit of V phase can be expressed by the next equation.

$$Voutu\_ave = Du \times Vdc + (1-Du) \times (-R \times Iu)$$

$$Voutv\_ave = Dv \times Vdc + (1-Dv) \times (-R \times Iv) \quad (2\text{-}8)$$

Herein, if the zero phase voltage value Vz is added to the condition of the equation (2-8), and a variation amount of the ratio of on period of each phase by the addition of the zero phase voltage value Vz is defined as ΔD, it can be expressed by the next equation.

$$Voutu\_ave = (Du + \Delta D) \times Vdc + (1-(Du + \Delta D)) \times (-R \times Iu)$$

$$Voutv\_ave = (Dv + \Delta D) \times Vdc + (1-(Dv + \Delta D)) \times (-R \times Iv) \quad (2\text{-}9)$$

From the equation (2-9), a line voltage ΔVout_uv between U phase and V phase can be expressed by the next equation.

$$\Delta Vout\_uv = Voutu\_ave - Voutv\_ave = (Du - Dv) \times Vdc + \Delta D \times R \times (Iu - Iv) \quad (2\text{-}10)$$

Compared with the equation (2-6) if not providing the resistor R, in the equation (2-10) if providing the resistor R, "ΔD×R×(Iu-Iv)" is added in the second term of the right side. Accordingly, if the resistor R is provided, an influence of addition of the zero phase voltage value Vz occurs in the line voltage, and the influence of the zero phase voltage value Vz appears in the winding current.

Accordingly, like the inverter of the lower arm three-shunt system of the present embodiment, or the inverter of the upper arm three-shunt system, or the inverter of the bus line one-shunt system, in the inverter in which a resistance value when the negative electrode side switching device SN is turned on and a resistance value when the positive electrode side switching device SP is turned on are different, the influence of addition of the zero phase voltage value Vz will appear in the line voltage and the winding current.

<Reduction of Unwanted Sound by Concept A>

In the following, it will be shown that by providing the resistor R in the inverter 4, even if variation of winding current increases by addition of the zero phase voltage value Vz, the unwanted sound of the AC rotary electric machine 1 can be reduced by addition of the zero phase voltage value Vz which satisfies the concept A.

Figure 31:
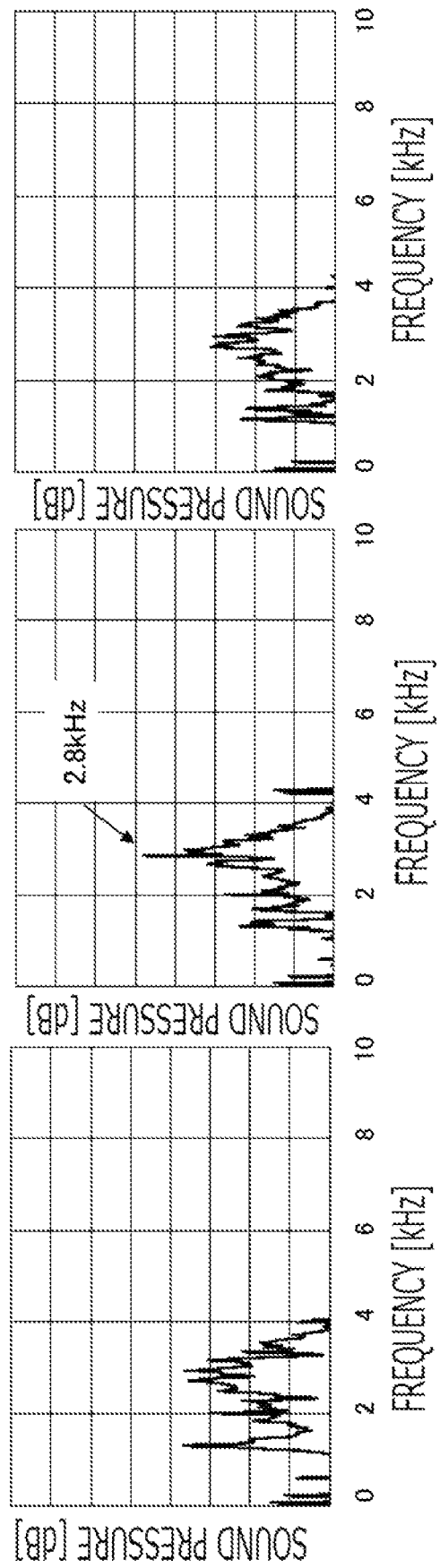
FIG. 31 is a figure showing the measured result of the sound level when changing setting of the zero phase voltage value in the condition where winding current is small according to Embodiment 2.

FIG. 31 and FIG. 32 show the measured result of the sound level when changing the setting of the zero phase voltage value Vz in the AC rotary electric machine 1 for the electric power steering apparatus which has the sensitivity characteristic of FIG. 9, using the inverter of the lower arm three-shunt system according to the present embodiment. FIG. 31 is the case of the effective value of winding current=10Arms, and FIG. 32 is the case of the effective value of winding current=70Arms.

The left side of FIG. 31 and FIG. 32 is a case of the zero phase voltage value Vz(t)=0. The center of FIG. 31 and FIG. 32 is a case of the zero phase voltage value Vz(t) by the seven pieces of zero phase candidate voltage values of the patent document 3. The right side of FIG. 31 and FIG. 32 is a case of the zero phase voltage value Vz (t) by the 80 pieces of zero phase candidate voltage values of FIG. 4. In the case of the patent document 3 of the center of FIG. 31 and FIG. 32 in which the concept A is not satisfied, the unwanted sound is deteriorated compared with the case of the zero phase voltage value Vz=0 of left side (especially, at 2.8 kHz close to the mechanical resonance frequency). Compared with FIG. 31 in which the effective value of winding current is small, in FIG. 32 in which the effective value of winding current is large, the deterioration degree of the unwanted sound becomes large.

On the other hand, in the case of the present disclosure of the right side of FIG. 31 and FIG. 32 in which the concept A is satisfied, the unwanted sound is reduced as a whole compared with the case of the zero phase voltage value Vz=0 of left side, and also at the mechanical resonance frequency, the unwanted sound is not increased but is reduced. Accordingly, compared with the increase in the unwanted sound due to the installation of the resistor R to the inverter 4, and the addition of the zero phase voltage value Vz, the decrease in the unwanted sound due to the addition of the zero phase voltage value Vz which satisfies the concept A exceeds. That is, even if the resistor R is provided in the inverter 4 like the inverter of the lower arm three-shunt system, the upper arm three-shunt system, and the bus line one-shunt system, by setting the n pieces of zero phase candidate voltage values so as to satisfy the concept A, and adding the zero phase voltage value Vz to the voltage command values of three-phase, the unwanted sound of the AC rotary electric machine 1 can be reduced in many frequency bands including the mechanical resonance frequency band of the AC rotary electric machine 1.

3. Embodiment 3

The AC rotary electric machine 1, the inverter 4, and the controller 10 according to Embodiment 3 will be explained. The explanation for constituent parts the same as those in Embodiment 1 will be omitted. The basic configuration of the AC rotary electric machine 1, the inverter 4, and the controller 10 according to the present embodiment is the same as that of Embodiment 1, 2. Embodiment 3 is different from Embodiment 1, 2 in that the controller 10 sets a command voltage vector, and corrects the command voltage vector according to the zero phase voltage value Vz, and performs on/off control of the switching devices according to the command voltage vector after correction.

<Voltage Command Calculation Unit 32>

Figure 33:
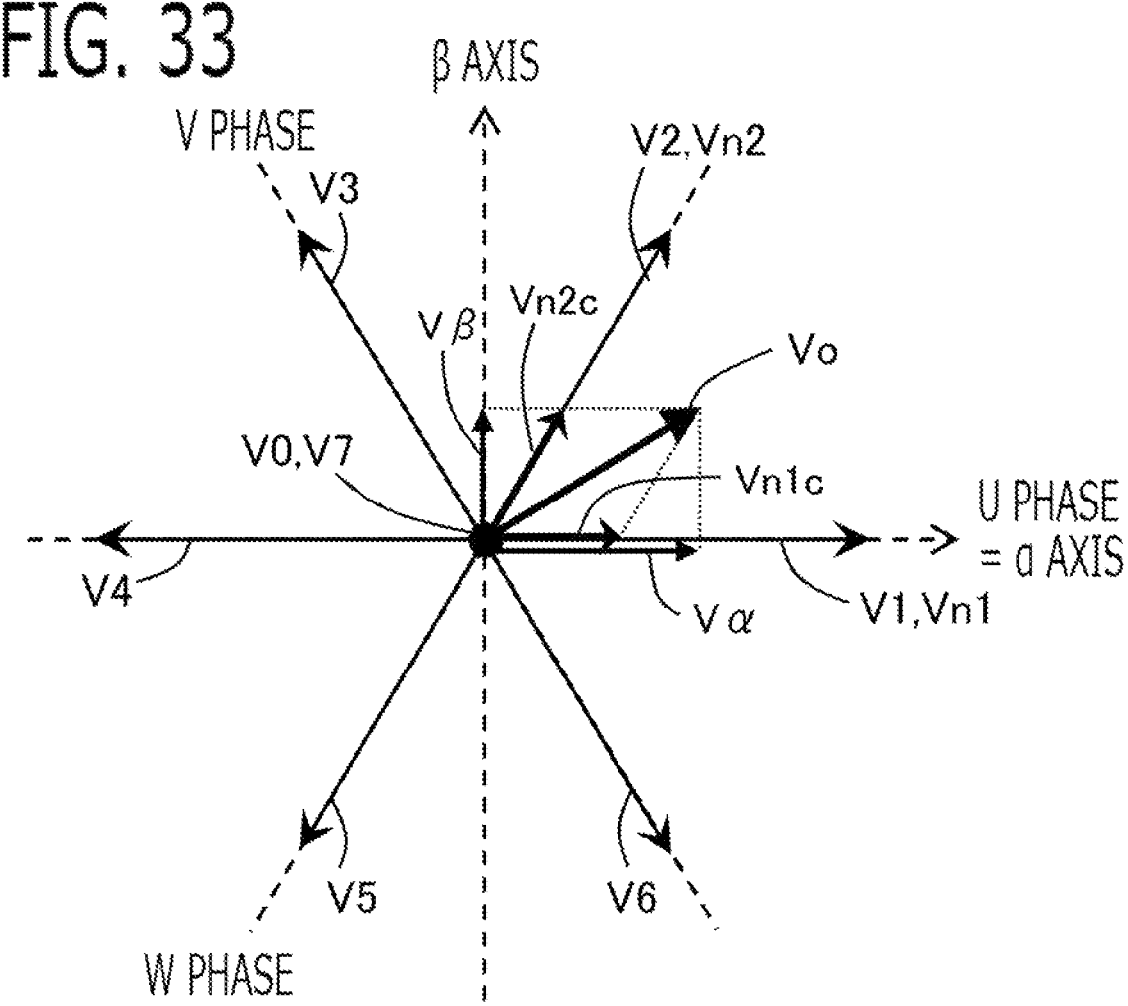
FIG. 33 is a figure explaining the voltage vector according to Embodiment 3.

In the present embodiment, the voltage command calculation unit 32 calculates a command voltage vector Vo which expresses voltages applied to the three-phase windings in a two-axis fixed coordinate system correlated with the three-phase windings. In the present embodiment, as shown in FIG. 33, the two-axis fixed coordinate system consists of α-axis defined in a direction of the winding Cu of U phase, and β-axis defined in a direction advanced to the α-axis by 90 degrees in an electrical angle. The magnetic pole position θ is an angle of the d-axis with respect to the α-axis.

Using the same method as Embodiment 1 or 2, the voltage command calculation unit 32 calculates the voltage command value of d-axis Vdo and the voltage command value of q-axis Vqo.

In the present embodiment, as shown in the next equation, the voltage command calculation unit 32 converts the voltage command value of d-axis Vdo and the voltage command value of q-axis Vqo into a voltage command value of α-axis Vα and a voltage command value of β-axis Vβ, by performing a fixed coordinate conversion based on the magnetic pole position θ. A voltage vector expressed by the voltage command value of α-axis Vα and the voltage command value of β-axis Vβ becomes the command voltage vector Vo.

[Equation 7]

$$\begin{bmatrix} V\alpha \\ V\beta \end{bmatrix} = \begin{bmatrix} \cos\theta & -\sin\theta \\ \sin\theta & \cos\theta \end{bmatrix} \begin{bmatrix} Vdo \\ Vqo \end{bmatrix} \quad (3-1)$$

The voltage command calculation unit 32 determines four on-off patterns of the plurality of switching devices which is set in the PWM periods Tc, based on the command voltage vector Vo, and determines periods of the four on-off patterns in the PWM period Tc. The determined four on-off patterns include two on-off patterns corresponding to the zero voltage vector. This processing is the same as the well-known space vector PWM.

As shown in FIG. 34, settable on-off patterns of the plurality of switching devices of the inverter 4 become eight in all. Herein, "1" shows that the switching device is turned on, and "0" shows that the switching device is turned off. The eight on-off patterns correspond to eight basic voltage vectors V0 to V7 shown in FIG. 33.

The zeroth basic voltage vector V0 is the zero voltage vector. That is to say, in the zeroth basic voltage vector V0, since all of the positive electrode side switching devices SPu, SPv, SPw of three-phase become OFF and all of the negative electrode side switching devices SNu, SNv, SNw of three-phase become ON, the DC voltage Vdc is not applied to the three-phase windings. The seventh basic voltage vector V7 is the zero voltage vector. That is to say, in the seventh basic voltage vector V7, since all of the positive electrode side switching devices SPu, SPv, SPw of three-phase become ON and all of the negative electrode side switching devices SNu, SNv, SNw of three-phase become OFF, the DC voltage Vdc is not applied to the three-phase windings.

The first basic voltage vector V1 becomes a vector in a direction of the winding of U phase. The second basic voltage vector V2 becomes a vector in a direction opposite to the direction of the winding of W phase. The third basic voltage vector V3 becomes a vector in a direction of the winding of V phase. The fourth basic voltage vector V4 becomes a vector in a direction opposite to the direction of the winding of U phase. The fifth basic voltage vector V5 becomes a vector in a direction of the winding of W phase. The sixth basic voltage vector V6 becomes a vector in a direction opposite to the direction of the winding of V phase.

The voltage command calculation unit 32 determines two basic voltage vectors (hereinafter, referred to as neighboring basic voltage vectors Vn1, Vn2) close to the command voltage vector Vo, from the six basic voltage vectors V1 to V6 except the zeroth and seventh basic voltage vectors V0, V7 which are the zero voltage vectors. Then, the voltage command calculation unit 32 determines the determined two neighboring basic voltage vectors Vn1, Vn2, and the zeroth and seventh basic voltage vectors V0, V7, as the four basic voltage vectors (hereinafter, referred to as set basic voltage vector) which are set in the PWM periods Tc.

In the example of FIG. 33, the first basic voltage vector V1 and the second basic voltage vector V2 close to the command voltage vector Vo are determined as the two neighboring basic voltage vector Vn1, Vn2.

Then, the voltage command calculation unit 32 decomposes the command voltage vector Vo into components Vn1c, Vn2c of the two neighboring basic voltage vector Vn1, Vn2. Then, as shown in the next equation, the voltage command calculation unit 32 calculates a ratio Dn1, Dn2 of set period of each of the two neighboring basic voltage vector Vn1, Vn2 in the PWM period Tc, based on a magnitude of each of the components of two neighboring basic voltage vectors Vn1c, Vn2c with respect to the DC voltage Vdc.

[Equation 8]

$$Dn1 = \sqrt{\frac{2}{3}} \frac{|Vn1c|}{Vdc} \quad (3\text{-}2)$$

$$Dn2 = \sqrt{\frac{2}{3}} \frac{|Vn2c|}{Vdc}$$

In the example of FIG. 33, as shown in the next equation, the magnitude of each of the components of two neighboring basic voltage vectors Vn1c, Vn2c is calculated, based on the voltage command value of α-axis Vα and the voltage command value of β-axis VB.

[Equation 9]

$$|Vn1c| = V\alpha - \frac{V\beta}{\sqrt{3}} \quad (3\text{-}3)$$

$$|Vn2c| = \frac{2V\beta}{\sqrt{3}}$$

Then, the voltage command calculation unit 32 set a ratio D0, D7 of set period of each of the zeroth and seventh basic voltage vectors V0, V7 which are the zero voltage vector in the PWM period Tc so as to satisfy the next equation.

$$D0+D7=1-(Dn1+Dn2) \quad (3\text{-}4)$$

That is to say, a period other than the set periods of the two neighboring basic voltage vectors Vn1, Vn2 in the PWM period Tc can be arbitrarily distributed and set to V0 and V7 which are the zero voltage vector. For example, the ratios D0, D7 of the set periods of V0 and V7 are set equally, as shown in the next equation.

$$D0=D7=\{1-(Dn1+Dn2)\}/2 \quad (3\text{-}5)$$

A period obtained by multiplying the PWM period Tc to each of the ratios Dn1, Dn2, D0, D7 of the set periods of the four set basic voltage vectors becomes a set period of each of the four set basic voltage vectors.

<Zero Phase Voltage Value Calculation Unit 33>

Similarly to Embodiment 1, the zero phase voltage value calculation unit 33 switches n pieces (n is a natural number greater than or equal to two) of zero phase candidate voltage values Vzc_1 to Vzc_n whose values are different with each other, in order, for every switching period Tv, and calculates as a zero phase voltage value Vz. The n pieces of zero phase candidate voltage valuesVzc_1 to Vzc_n are preliminarily set so that the concept A is satisfied.

<Voltage Command Correction Unit 34>

In the present embodiment, the voltage command correction unit 34 corrects the command voltage vector Vo based on the zero phase voltage value Vz. The voltage command correction unit 34 changes the periods of the two on-off patterns corresponding to the zero voltage vector (in this example, the set periods of the zeroth and seventh basic voltage vectors V0, V7) so that a total of two periods does not change, according to the zero phase voltage value Vz.

As shown in the next equation, the voltage command correction unit 34 calculates the zero phase voltage correction period ratio Dz by dividing the zero phase voltage value Vz by the DC voltage Vdc.

$$Dz=Vz/Vdc \quad (3\text{-}6)$$

Then, as shown in the next equation, the voltage command correction unit 34 calculates a ratio D0c of set period of the zeroth basic voltage vector V0 after correction, by adding the zero phase voltage correction period ratio Dz to the ratio D0 of set period of the zeroth basic voltage vector V0; and calculates a ratio D7c of set period of the seventh basic voltage vector V7 after correction, by subtracting the zero phase voltage correction period ratio Dz from the ratio D7 of set period of the seventh basic voltage vector V7.

$$D0c=D0+Dz$$

$$D7c=D7-Dz \quad (3\text{-}7)$$

A period obtained by multiplying the PWM period Tc to each of the ratios D0c, D7c of set periods of the zeroth and seventh basic voltage vectors after correction becomes a set period of each of the zeroth and seventh basic voltage vectors. The ratios Dn1, Dn2 of set periods of the two neighboring basic voltage vector Vn1, Vn2 do not be changed by the zero phase voltage value Vz.

<PWM Control Unit 35>

The PWM control unit 35 controls on/off of the plurality of switching devices, based on the four on-off patterns (in this example, the two neighboring basic voltage vectors Vn1, Vn2, and the zeroth and seventh basic voltage vectors V0, V7) determined by the voltage command calculation unit 32, and the periods of the four on-off patterns (in this example, Dn1, Dn2, D0c, D7c) which were determined and corrected by the voltage command calculation unit 32 and the voltage command correction unit 34.

The PWM control unit 35 generates switching signals GPu to GNw of each switching device, based on the four set basic voltage vectors (Vn1, Vn2, V0, V7) which are set in the PWM period Tc, and the ratios (Dn1, Dn2, D0c, D7c) of set periods of the four set basic voltage vectors in the PWM period Tc. For example, in the example of FIG. 33, as shown in FIG. 35, the switching signals GPu to GNw of each switching device are generated.

Herein, a voltage obtained by multiplying the DC voltage Vdc to the switching signal GPu, GPv, GPw of the positive electrode side switching device of each phase corresponds to an applied voltage Vu_PWM, Vv_PWM, Vw_PWM of the winding of each phase.

In this way, since only the set periods of the zeroth and seventh basic voltage vectors which are the zero voltage vector are changed by the zero phase voltage values Vz, and the set periods of the two neighboring basic voltage vector Vn1, Vn2 which are not the zero voltage vector are not changed by the zero phase voltage values Vz, the average value of the applied voltage to the winding in the PWM period Tc does not change. Accordingly, since the average value of the line voltage in the PWM period Tc does not change, the winding current does not change by correction of the zero phase voltage value Vz. On the other hand, by changing the set periods of the zeroth and seventh basic voltage vectors which are the zero voltage vector by the zero phase voltage value Vz, the ON timing and OFF timing of the applied voltage Vu_PWM, Vv_PWM, Vw_PWM of the winding of each phase are varied equally about all phase. Accordingly, similarly to Embodiments 1 and 2, the harmonic wave component of the applied voltage of the winding of each phase can be reduced in many bands of 150 kHz to 3000 kHz, and the noise generated from the inverter 4 can be reduced. Since the zero phase voltage value Vz satisfied the concept A, the unwanted sound of the AC rotary electric machine 1 can be reduced in many frequency bands including the mechanical resonance frequency band of the AC rotary electric machine 1.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) The zero phase voltage value calculation unit 33 may change a magnitude of the zero phase voltage value Vz according to an amplitude of the applied voltages to three-phase windings. For example, in Embodiments 1 and 2, the amplitude of the applied voltages to three-phase windings is set to an amplitude of the fundamental wave components of the voltage command values of three-phase Vub, Vvb, Vwb. In Embodiment 3, the amplitude of the applied voltages to three-phase windings is set to a magnitude of the command voltage vector Vo. Then, the zero phase voltage value calculation unit 33 sets a gain according to the amplitude of the applied voltages to three-phase windings; and set the zero phase voltage value Vz by multiplying the gain to a voltage value which switched the n pieces of zero phase candidate voltage values Vzc_1 to Vzc_n in order for every switching period Tv. For example, the zero phase voltage value calculation unit 33 decreases the gain, as the amplitude of the applied voltages to three-phase windings increases. The zero phase voltage value calculation unit 33 decreases the gain, as the rotational speed of the AC rotary electric machine 1 increases.

(2) The zero phase voltage value calculation unit 33 may change the magnitude of the zero phase voltage value Vz according to the DC voltage Vdc. The zero phase voltage value calculation unit 33 sets a gain according to the DC voltage Vdc; and set the zero phase voltage value Vz by multiplying the gain to a voltage value which switched the n pieces of zero phase candidate voltage values Vzc_1 to Vzc_n in order for every switching period Tv. For example, the zero phase voltage value calculation unit 33 increases the gain, as the DC voltage Vdc increases.

(3) The AC rotary electric machine 1 may be a rotary electric machine which is provided with the three-phase windings, for example, may be the field winding type synchronous rotary electric machine in which a field winding is provided in the rotor, or may be the induction machine in which the permanent magnet is not provided in the rotor. And, the AC rotary electric machine 1 may be a rotary electric machine in which plural pairs of three-phase windings are provided. The configuration of present disclosure is applicable to each pair of the three-phase windings.

(4) In Embodiment 2, current sensors may be provided on the wires which connects the inverter 4 and the three-phase windings.

(5) The AC rotary electric machine 1 may be a driving force source of various kinds of apparatuses other than the electric power steering apparatus 100. For example, the AC rotary electric machine 1 may be a driving force source of vehicle wheel.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: AC Rotary Electric Machine, 4: Inverter, 10: Controller for AC Rotary Electric Machine, 32: Voltage Command Calculation Unit, 33: Zero Phase Voltage Value Calculation Unit, 34: Voltage Command Correction Unit, 35: PWM Control Unit, 100: Electric Power Steering Apparatus, CA: Carrier wave, R: Resistor, Tc: PWM period, Tm: Resonance period, Tv: Switching period, Vo: Command voltage vector, Vz: Zero phase voltage value, VzAC: AC component of zero phase voltage value, VzAC_rms: Effective value of AC component of zero phase voltage value, Vzc: Zero phase candidate voltage value, Vzdif: Zero phase time lag deviation value, Vzdif_rms: Effective value of zero phase time lag deviation value

What is claimed is:

1. A controller for AC rotary electric machine that controls an AC rotary electric machine which is provided with a stator where three-phase windings are wound and a rotor, via an inverter which is provided a plurality of switching devices, the controller for AC rotary electric machine comprising at least one processor configured to implement:

a voltage command calculator that calculates voltage command values of three-phase applied to the three-phase windings, or a command voltage vector which expresses voltages applied to the three-phase windings in a two-axis fixed coordinate system correlated with the three-phase windings;

a zero phase voltage value calculator that switches n pieces (n is a natural number greater than or equal to two) of zero phase candidate voltage values whose values are different with each other, in order, for every switching period, and calculates as a zero phase voltage value;

a voltage command corrector that corrects the voltage command values of three-phase or the command voltage vector, based on the zero phase voltage value; and a PWM controller that controls on/off of the plurality of switching devices, based on the voltage command values of three-phase after correction or the command voltage vector after correction by the voltage command corrector;

wherein, by defining a deviation between the zero phase voltage value, and a time lag zero phase voltage value obtained by delaying the zero phase voltage value by a j times value of the switching period (j is a natural number greater than or equal to one), as a zero phase time lag deviation value, j is a natural number which minimizes a difference between a half period of a mechanical resonance period of the AC rotary electric machine, and the j times value of switching period, and the n pieces of zero phase candidate voltage values are preliminarily set so that an effective value of the zero phase time lag deviation value becomes small compared with an effective value of an AC component of the zero phase voltage value.

2. The controller for AC rotary electric machine according to claim 1, wherein the voltage command calculator calculates the voltage command values of three-phase, wherein the voltage command corrector calculates the voltage command values of three-phase after correction by adding the zero phase voltage value to each of the voltage command values of three-phase, and wherein the PWM controller compares a carrier wave which vibrates at a PWM period with each of the voltage command values of three-phase after correction, and controls on/off of the plurality of switching devices based on a comparison result.

3. The controller for AC rotary electric machine according to claim 1, wherein the voltage command calculator calculates the command voltage vector; determines four on-off patterns of the plurality of switching devices which includes two on-off patterns corresponding to the zero voltage vector and are set in the PWM period, based on the command voltage vector; and determines a period of each of the four on-off patterns in the PWM period, wherein the voltage command corrector changes the periods of the two on-off patterns corresponding to the zero voltage vector so that a total of two periods does not change, according to the zero phase voltage value, wherein the PWM controller controls on/off of the plurality of switching devices, based on the four on-off patterns determined by the voltage command calculator, and the periods of the four on-off patterns which were determined and corrected by the voltage command calculator and the voltage command corrector.

4. The controller for AC rotary electric machine according to claim 1, wherein the inverter is provided with three sets of series circuits in each of which a positive electrode side switching device connected to a positive electrode side of a DC power source and a negative electrode side switching device connected to a negative electrode side of the DC power source are connected in series and a connection node of series connection is connected to the winding of the corresponding phase, corresponding to respective phases of the three-phase, and wherein the series circuit of at least one phase is provided with a resistance connected to the positive electrode side switching device or the negative electrode side switching device in series.

5. The controller for AC rotary electric machine according to claim 4, wherein the voltage command calculator detects a current which flows into the winding, based on a both ends potential difference of the resistance; and calculates the voltage command values of three-phase or the command voltage vector, based on a detection value of current.

6. The controller for AC rotary electric machine according to claim 1, wherein the n pieces of zero phase candidate voltage values are preliminarily set so that a difference between a maximum value of the n pieces of zero phase candidate voltage values and a minimum value of the n pieces of zero phase candidate voltage values becomes greater than or equal to 5% of a DC voltage supplied to the inverter.

7. The controller for AC rotary electric machine according to claim 1, wherein the n pieces of zero phase candidate voltage values are preliminarily set so that a difference between a maximum value of the n pieces of zero phase candidate voltage values and a minimum value of the n pieces of zero phase candidate voltage values becomes greater than or equal to 10% of a DC voltage supplied to the inverter.

8. An electric power steering apparatus comprising:
the controller for AC rotary machine according to claim 1,
the inverter,
the AC rotary electric machine, and
a driving force transmission mechanism that transmits a driving force of the AC rotary electric machine to a steering device of a vehicle,
wherein a PWM period of the PWM controller is set less than or equal to 60 µs, and
wherein the mechanical resonance period of the AC rotary electric machine is in a range greater than or equal to 200 µs and less than or equal to 500 µs.

* * * * *